(12) United States Patent
Tazawa et al.

(10) Patent No.: US 9,116,414 B2
(45) Date of Patent: Aug. 25, 2015

(54) WAVELENGTH SELECTIVE SWITCH

(71) Applicant: Sumitomo Electric Industries, Ltd., Osaka-shi (JP)

(72) Inventors: Hidehisa Tazawa, Yokohama (JP); Manabu Shiozaki, Yokohama (JP); Kenichiro Takahashi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/207,071

(22) Filed: Mar. 12, 2014

(65) Prior Publication Data

US 2014/0268305 A1 Sep. 18, 2014

(30) Foreign Application Priority Data

Mar. 15, 2013 (WO) .................. PCT/JP2013/057413
Dec. 3, 2013 (JP) ................................. 2013-250384

(51) Int. Cl.
*G02F 1/29* (2006.01)
*G02F 1/31* (2006.01)
(Continued)

(52) U.S. Cl.
CPC .............. *G02F 1/31* (2013.01); *G02B 6/29311* (2013.01); *G02B 6/3528* (2013.01); *G02B 6/3556* (2013.01)

(58) Field of Classification Search
CPC ................. H04Q 11/0005; H04Q 2011/0007; H04Q 2011/0037; G02F 2201/34
USPC ........... 359/318, 320, 201.2, 204.1, 434, 566, 359/569, 572, 615, 618, 627; 398/45, 48, 398/49, 53, 85–88; 385/10, 16, 18, 22, 36, 385/37
See application file for complete search history.

(56) References Cited

U.S. PATENT DOCUMENTS 7,787,720 B2 8/2010 Frisken et al.
8,190,025 B2 * 5/2012 Presley et al. ................... 398/48
(Continued)

FOREIGN PATENT DOCUMENTS

JP 2008-536168 A 9/2008
JP 2008-541187 A 11/2008
(Continued)

OTHER PUBLICATIONS

International Search Report in PCT International Application No. PCT/JP2013/057413, dated Jun. 25, 2013.
(Continued)

*Primary Examiner* — Tuyen Tra
(74) *Attorney, Agent, or Firm* — Venable LLP; Michael A. Sartori

(57) ABSTRACT

A wavelength selective switch includes: a port array that includes an input port for inputting a signal light and an output port for outputting the signal light which are arranged in a first direction; a dispersive element that disperses the signal light in a second direction; a condensing element that condenses signal lights; a light deflection element that deflects the signal lights toward the output port; a first optical system that matches a beam waist position of the signal light incident onto the condensing element with a front focus of the condensing element in the optical axis direction, in a first plane that extends in the first direction; and a second optical system that shifts the beam waist position of the signal light incident onto the condensing element from the front focus in the optical axis direction, in a second plane that extends in the second direction.

22 Claims, 16 Drawing Sheets

(51) Int. Cl.
*G02B 6/35* (2006.01)
*G02B 6/293* (2006.01)

(56) References Cited

U.S. PATENT DOCUMENTS

2006/0077552 A1   4/2006   Helbing et al.
2009/0220233 A1   9/2009   Presley et al.

FOREIGN PATENT DOCUMENTS

| JP | 2009-276747 A | 11/2009 |
|---|---|---|
| JP | 2010-072339 A | 4/2010 |
| JP | 2011-065023 A | 3/2011 |
| JP | 2011-145462 A | 7/2011 |
| JP | 2011-248000 A | 12/2011 |
| JP | 2012-220924 A | 11/2012 |
| WO | WO-2005/122451 A1 | 12/2005 |
| WO | WO-2006/123344 A2 | 11/2006 |

OTHER PUBLICATIONS

Extended European Search Report in European Patent Application No. 14159467.1, dated Oct. 6, 2014.

S. A. Self, "Focusing of spherical Gaussian beams", Applied Optics, Optical Society of America, Mar. 1, 1983, vol. 22, No. 5, pp. 658-661.

* cited by examiner

WAVELENGTH SELECTIVE SWITCH

BACKGROUND OF THE INVENTION

1. Field of the Invention

One aspect of the present invention relates to a wavelength selective switch.

2. Related Background Art

An optical device disclosed in PCT Japanese Translation Patent Publication No. 2008-536168 (hereinafter, referred to as "PTL 1") includes plural input and output ports provided by a fiber-coupled collimator; an anamorphic system that converts a signal light input from an input port into a beam having a predetermined beam profile; a diffraction grating for spatially separating the beam; a focusing optical device for converting a beam separated by the diffraction grating into a channel beam having an elongated beam profile; an array of micro mirrors having an elongated shape suitable for the beam profile of the channel beam; and a control system that controls rotation of the micro mirror to switch the channel beam into a predetermined output port.

SUMMARY OF THE INVENTION

In the optical device disclosed in PTL 1, as an example of the anamorphic system for providing the elongated beam profile on the micro mirror, a technique that uses plural lenses or the like of a double conical shape, a cylindrical shape or an annular shape has been proposed. However, in this case, in order to increase an aspect ratio of a beam size, it is necessary to use a multiplicity of the above-mentioned lenses or the like. As a result, the length of an optical path is increased, and the structure is complicated. Further, when a desired aspect ratio is realized, the degree of freedom in an optical design is deteriorated.

An object of one aspect of the present invention is to provide a wavelength selective switch capable of enhancing a flexibility of an optical design.

The wavelength selective switch according to one aspect of the present invention a wavelength selective switch including: a port array that includes an input port for inputting a signal light and an output port for outputting the signal light which are arranged in a first direction; a dispersive element that disperses the signal light in a second direction different from the first direction; a condensing element that condenses signal lights dispersed by the dispersive element, respectively; a light deflection element that deflects each of the signal lights condensed by the condensing element toward the output port; a first optical system that matches a beam waist position of the signal light incident onto the condensing element with a front focus of the condensing element in an optical axis direction of the signal light, in a first plane that extends in the first direction and the optical axis direction; and a second optical system that shifts the beam waist position of the signal light incident onto the condensing element from the front focus of the condensing element in the optical axis direction, in a second plane that extends in the second direction and the optical axis direction.

According to one aspect of the present invention, it is possible to provide a wavelength selective switch capable of enhancing a flexibility of an optical design.

DETAILED DESCRIPTION

Description of Embodiments

Figure 1:
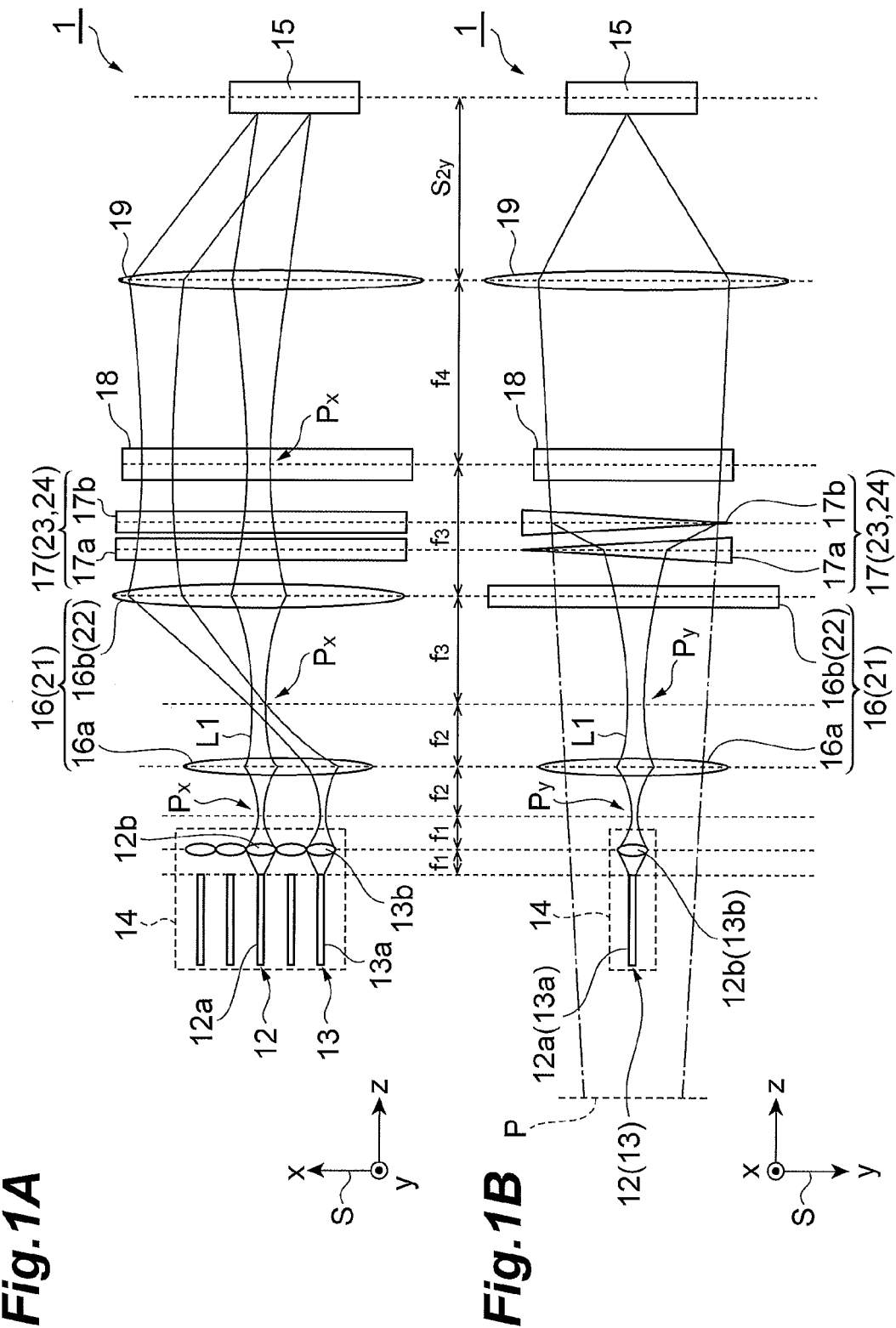
FIGS. 1A and 1B are diagrams schematically illustrating a configuration of a first embodiment of a wavelength selective switch according to one aspect of the present invention.

First, embodiments of a wavelength selective switch according to one aspect of the present invention will be described.

According to one embodiment of the present invention, a wavelength selective switch includes: a port array that includes an input port for inputting a signal light and an output port for outputting the signal light which are arranged in a first direction; a dispersive element that disperses the signal light in a second direction different from the first direction; a condensing element that condenses signal lights dispersed by the dispersive element, respectively; a light deflection element that deflects each of the signal lights condensed by the condensing element toward the output port; a first optical system that matches a beam waist position of the signal light incident onto the condensing element with a front focus of the condensing element in an optical axis direction of the signal light, in a first plane that extends in the first direction and an optical axis direction of the signal light; and a second optical system that shifts the beam waist position of the signal light incident onto the condensing element from the front focus of the condensing element in the optical axis direction, in a second plane that extends in the second direction and the optical axis direction.

In the wavelength selective switch, the signal light input from the input port is dispersed by the dispersive element, and then is incident onto the condensing element. The signal light incident onto the condensing element is condensed by the condensing element, and is incident onto the light deflection element. The signal light incident onto the light deflection element is deflected toward the output port. Here, the wavelength selective switch includes the first optical system. The first optical system allows the beam waist position of the signal light incident onto the condensing element to coincide with the front focus of the condensing element in the first plane. The first plane is a plane that extends in the first direction and the optical axis direction of the signal light. An example of the first direction is an arrangement direction of the input port and the output port. On the other hand, the wavelength selective switch includes the second optical system. The second optical system shifts the beam waist position of the signal light incident onto the condensing element from the front focus of the condensing element in the second plane. The second plane is a plane that extends in the second direction and the optical axis direction of the signal light. An example of the second direction is a dispersive direction of the dispersive element. In this way, when a desired aspect ratio of a beam size is realized, if the beam waist position of the signal light coincides with the focus of the condensing element in the first plane and the beam waist position of the signal light shifts from the focus of the condensing element in the second plane, the flexibility of an optical design is improved. Here, the aspect ratio represents a value obtained by dividing the beam size of the signal light on the light deflection element in the first plane by the beam size of the signal light on the light deflection element in the second plane.

According to one embodiment of the present invention, in the wavelength selective switch, the first optical system may include a first element having an optical power in the first plane and the second plane, and a second element having an optical power at least in the first plane. Using the first and second elements, the first optical system may preferably be configured.

According to one embodiment of the present invention, in the wavelength selective switch, the second optical system may dispose the beam waist position of the signal light incident onto the condensing element at a front stage of the front focus of the condensing element in the optical axis direction in the second plane. In this case, in the second plane, the signal light is incident onto the condensing element while being spread from the beam waist position. That is, it is possible to allow the second optical system to contribute to improve the aspect ratio.

According to one embodiment of the present invention, in the wavelength selective switch, the second optical system may include a third element having an optical power only in the first plane among the first plane and the second plane. In this case, the second optical system may easily be formed.

According to one embodiment of the present invention, in the wavelength selective switch, the second optical system may dispose the beam waist position of the signal light incident onto the condensing element at a rear stage of the front focus of the condensing element in the optical axis direction in the second plane. In this case, in the second plane, it is possible to disperse the signal light by the dispersive element at a stage where spread of the signal light is relatively small. Thus, the dispersive element may be miniaturized.

According to one embodiment of the present invention, in the wavelength selective switch, the second optical system may include at least one pair of prisms. In this case, the second optical system may easily be formed. Further, since the prism does not have an optical power, the flexibility of an optical design is improved.

According to one embodiment of the present invention, the wavelength selective switch may further include a third optical system that enlarges a distance from the beam waist position of the signal light incident onto the condensing element to the condensing element in the second plane. In this case, an optical loss may be reduced.

According to one embodiment of the present invention, in the wavelength selective switch, the third optical system may include at least one pair of prisms. In this case, the third optical system may easily be formed. Further, since the prism does not have an optical power, the flexibility of an optical design is improved.

According to one embodiment of the present invention, in the wavelength selective switch, in the second plane, when a distance from the beam waist position of the signal light incident onto the condensing element to the condensing element is $S_{1y}$, a focus distance of the condensing element is $f_4$, and a beam size at a beam waist position of a signal light output from the condensing element is $D_{2y}$, a first value $V_1$ expressed by the following Expression (1) may be smaller than a change point where the beam size $D_{2y}$ is changed when the first value $V_1$ is changed. In this case, in the second plane, it is possible to change the first value $V_1$ (for example, distance $S_{1y}$) while suppressing the change of the beam size $D_{2y}$. Thus, the flexibility of an optical design is improved.

$$V_1 = \left| \frac{S_{1y}}{f_4} \right| \quad (1)$$

According to one embodiment of the present invention, in the wavelength selective switch, in the second plane, when a distance from the beam waist position of the signal light incident onto the condensing element to the condensing element is $S_{1y}$, a focus distance of the condensing element is $f_4$, and a beam size at a beam waist position of a signal light output from the condensing element is $D_{2y}$, a first value $V_1$ expressed by the following Expression (1) may be greater than a change point where the beam size $D_{2y}$ is changed when the first value $V_1$ is changed. In this case, it is possible to change (for example, reduce) the beam size $D_{2y}$ by changing the first value $V_1$ (for example, distance $S_{1y}$) in the second plane. Thus, the aspect ratio may be improved.

$$V_1 = \left| \frac{S_{1y}}{f_4} \right| \quad (1)$$

According to one embodiment of the present invention, the wavelength selective switch may further include a fourth optical system that enlarges a second value $Z_{ry}$ expressed by the following Expression (2), in the second plane, when a beam size at the beam waist position of the signal light incident onto the condensing element is $D_{1y}$, and a wavelength of the signal light is $\lambda$. In this case, an optical loss may be reduced.

$$Z_{ry} = \frac{\pi D_{1y}^2}{4\lambda} \quad (2)$$

According to one embodiment of the present invention, in the wavelength selective switch, the fourth optical system may include at least one pair of prisms. In this case, the fourth optical system may easily be formed. Further, since the prism does not have an optical power, the flexibility of an optical design is improved.

According to one embodiment of the present invention, in the wavelength selective switch, in the second plane, when a beam size at the beam waist position of the signal light incident onto the condensing element is $D_{1y}$, a wavelength of the signal light is $\lambda$, and a focus distance of the condensing element is $f_4$, a third value $V_3$ expressed by the following Expression (3) using the second value $Z_{ry}$ expressed by the following Expression (2) may be equal to or greater than 4. In this case, a region of the first value $V_1$ where it is possible to change the first value $V_1$ (for example, the distance $S_{1y}$) while suppressing the change of the beam size $D_{2y}$ is relatively increased. Thus, the flexibility of an optical design is improved.

$$Z_{ry} = \frac{\pi D_{1y}^2}{4\lambda} \quad (2)$$

$$V_3 = \frac{Z_{ry}}{f_4} \quad (3)$$

According to one embodiment of the present invention, in the wavelength selective switch, the light deflection element may be arranged at the beam waist position of the signal light output from the condensing element in the second plane. In this case, an optical loss may be reduced.

According to one embodiment of the present invention, the wavelength selective switch may satisfy Expression (4), when a distance from a beam waist position of the signal light output from the condensing element to the condensing element in the second plane is $S_{2y}$, a beam size of the signal light at a beam waist position of the signal light output from the condensing element in the first plane is $D_{2x}$, a focus distance of the condensing element is $f_4$, and a wavelength of the signal light is $\lambda$. In this case, an optical loss may be reduced.

$$|S_{2y} - f_4| \le \frac{\pi D_{2x}^2}{4\lambda} \quad (4)$$

According to one embodiment of the present invention, in the wavelength selective switch, an incident angle of the signal light input to the prisms may be equal to or greater than 70 degrees. In this case, for example, the signal light may sufficiently be enlarged by the prism in the second plane. Accordingly, the aspect ratio may sufficiently be increased.

According to one embodiment of the present invention, in the wavelength selective switch, an incident angle of the signal light input to the prisms may be approximately the same as a Brewster angle. In this case, an optical reflection of a P polarization included in the signal light may be reduced.

According to one embodiment of the present invention, in the wavelength selective switch, a refractive index of the prisms may be equal to or higher than 1.5. In this case, when the signal light is incident onto the prisms at a large incident angle, an optical reflection of the signal light may be reduced. Thus, it is easy to set the incident angle of the signal light to the prisms as described above.

According to one embodiment of the present invention, in the wavelength selective switch, the refractive index of the prism may be equal to or higher than 3.0. In this case, it is possible to preferably set the incident angle of the signal light to the prisms as described above.

According to one embodiment of the present invention, the wavelength selective switch may further include a polarization diversity module arranged at a front side of the first optical system. In this case, a polarization dependent loss may be reduced. In particular, by arranging the polarization diversity module at the front stage of the first optical system, the polarization diversity module may be miniaturized.

According to one embodiment of the present invention, in the wavelength selective switch, the polarization diversity module may include a polarization beam splitter that separates the signal light according to a polarization direction in the second direction, a polarization rotation element that allows a polarization direction of one of signal lights separated by the polarization beam splitter to coincide with a polarization direction of the other thereof, and an optical path adjustment element that allows the length of an optical path of one of the signal lights separated by the polarization beam splitter to coincide with the length of an optical path of the other thereof. In this case, since the signal light is polarized and separated in the dispersive direction, the size of the wavelength selective switch in the first direction may be miniaturized.

According to one embodiment of the present invention, in the wavelength selective switch, the port array, the dispersive element and the light deflection element may be arranged on a predetermined axis line, the port array may include a first part that includes a first input/output including a first input port that is one of the input port for inputting the signal light along a first optical axis and a first output port that is one of the output port for outputting the signal light incident on the first output port along the first optical axis, and the first optical axis is inclined in the first direction with respect to the predetermined axis line, and a second part that includes a second input/output including a second input port that is one of the input port for inputting the signal light along a second optical axis and a second output port that is one of the output port for outputting the signal light incident on the second output port along the second optical axis, and the second optical axis is inclined in the first direction with respect to the predetermined axis line, an inclination angle of the first optical axis and an inclination angle of the second optical axis with reference to the predetermined axis line may be different from each other, the dispersive element may be provided in common to the first input/output and the second input/output, the light deflection element may include a first light deflection part that directs the signal light input from the first input port toward the first output port, and a second light deflection part that directs the signal light input from the second input port toward the second output port. In this case, it is possible to reduce the number of parts, and to separate (or combine) plural wavelength components without excessively increasing the length of the optical path.

DETAILED DESCRIPTION OF EMBODIMENTS

Hereinafter, embodiments of a wavelength selective switch according to one aspect of the present invention will be described with reference to the drawings. In description of the drawings, the same reference numbers are given to the same or equivalent components, and the same description will not be repeated. One aspect of the present invention is not limited to the exemplified embodiments. One aspect of the present invention is defined by claims, and includes any modification within a meaning or range equivalent to claims.

First Embodiment

FIGS. 1A and 1B are diagrams schematically illustrating a configuration of a first embodiment of a wavelength selective switch according to one aspect of the present invention. In the following drawings, there is a case where an orthogonal coordinate system S is shown. FIG. 1A is a diagram when seen in a y-axis direction of the orthogonal coordinate system S, which schematically illustrates a wavelength selective switch in an x-z plane (a first plane) that extends in an x-axis direction (a first direction) and a z-axis direction (an optical axis direction of a signal light). FIG. 1B is a diagram when seen in the x-axis direction of the orthogonal coordinate system S, which schematically illustrates the wavelength selective switch in a y-z plane (a second plane) that extends in the y-axis direction (a second direction) and the z-axis direction (the optical axis direction of the signal light).

As shown in FIGS. 1A and 1B, a wavelength selective switch 1 according to the present embodiment includes a port array 14 that includes an input port 12 and an output port 13 which are arranged in the x-axis direction, and a light deflection element 15 that deflects a signal light L1 input from the input port 12 toward the output port 13. Further, the wavelength selective switch 1 includes a relay optical system 16, an anamorphic optical system 17, a dispersive element 18, and a condensing lens (condensing element) 19 that are sequentially arranged on an optical path (on an optical axis) of the signal light L1 that travels from the input port 12 to the light deflection element 15.

Hereinafter, the side of the input port 12 on the optical path of the signal light L1 that travels from the input port 12 to the light deflection element 15 is referred to as a front stage (or a front side). Further, the side of the light deflection element 15 on the optical path of the signal light L1 that travels from the input port 12 to the light deflection element 15 is referred to as a rear stage (or a rear side).

The port array 14 includes one input port 12 and plural output ports 13, for example. The input port 12 includes an optical fiber 12a and a collimating lens 12b optically connected to the optical fiber 12a, for example. The input port 12 inputs the signal light L1 that is a wavelength multiplexing light, for example. The output port 13 includes an optical fiber 13a and a collimating lens 13b that is optically connected to the optical fiber 13a, for example. The output port 13 outputs a signal light of each wavelength component deflected by the light deflection element 15, for example.

The relay optical system 16 is optically connected to the collimating lenses 12b and 13b and the condensing lens 19. The relay optical system 16 includes a first lens 16a and a second lens 16b. The first lens 16a has an optical power in the x-z plane and the y-z plane. The first lens 16a is a rotation symmetry lens called a convex spherical lens, for example. The first lens 16a is arranged at the front stage with reference to the second lens 16b. The first lens 16a is arranged so that a front focus of the first lens 16a approximately coincides with rear focuses of the collimating lenses 12b and 13b. That is, the first lens 16a is arranged at a position separated from the collimating lenses 12b and 13b by a focus distance $f_1$ of the collimating lenses 12b and 13b and a focus distance $f_2$ of the first lens 16a.

The second lens 16b has an optical power at least in the x-z plane. Here, the second lens 16b has the optical power only in the x-z plane among the x-z plane and the y-z plane. The second lens 16b is a cylindrical lens having an optical power only in the x-z plane, for example. The second lens 16b is arranged so that a front focus of the second lens 16b approximately coincides with a rear focus of the first lens 16a in the x-z plane. Further, the second lens 16b is arranged so that a rear focus of the second lens 16b approximately coincides with a front focus of the condensing lens 19 in the x-z plane. That is, the second lens 16b is arranged at a position separated from the first lens 16a by the focus distance $f_2$ of the first lens 16a and a focus distance $f_3$ of the second lens 16b, that is, at a position separated from the condensing lens 19 by the focus distance $f_3$ of the second lens 16b and a focus distance $f_4$ of the condensing lens 19.

The first and second elements of the relay optical system 16 may employ a reflection type element such as a mirror, instead of a transmission type element such as a lens, as long as they have the above-described optical power. Here, an optical power is defined as the reciprocal of a focus distance.

The anamorphic optical system 17 may be arranged at the front stage or the rear stage of the relay optical system 16. Here, the anamorphic optical system 17 is arranged at the rear stage of the relay optical system 16. The signal light L1 output from the relay optical system 16 (the second lens 16b) is incident onto the anamorphic optical system 17. Further, the anamorphic optical system 17 enlarges a beam size of the signal light L1 in the y-z plane among the x-z plane and the y-z plane. That is, the anamorphic optical system 17 has a function for converting an aspect ratio of the input beam for output. The anamorphic optical system 17 may be configured by an individual element of a prism pair, a cylindrical lens, a cylindrical mirror or the like, or by a combination thereof. Here, the anamorphic optical system 17 is configured by a pair of prisms 17a and 17b.

An incident angle of the signal light L1 input from the input port 12 with respect to the prism 17a at the front stage may be set to 70 degrees or greater, for example. In this case, it is possible to sufficiently enlarge the beam size of the signal light L1 in the y-z plane. Further, the incident angle to the prism 17a, of the signal light L1 input through the input port 12, may be set to be approximately the same as a Brewster angle, for example. In this case, it is possible to reduce a reflection light due to polarization dependence of the signal light L1. That is, it is possible to reduce the reflection of a P polarization included in the signal light L1.

Refractive indexes of the prisms 17a and 17b may be set to 1.5 or greater, for example. Further, the refractive indexes of the prisms 17a and 17b may be set to 3 or greater, for example. In these cases, even if the signal light L1 is incident onto the prisms 17a and 17b at a large incident angle, it is possible to make the reflection light relatively small. Thus, it is easy to set the incident angle of the signal light L1 to the prisms 17a and 17b as described above. In particular, if the refractive indexes of the prisms 17a and 17b are set to 3 or greater, it is possible to set the incident angle of the signal light L1 to the prisms 17a and 17b to 70 degrees or greater and to be approximately the same as the Brewster angle.

The signal light that is input from the input port 12 and passes through the relay optical system 16 and the anamorphic optical system 17 is incident onto the dispersive element 18. The dispersive element 18 disperses the incident signal light L1 in the y-axis direction (that is, in the y-z plane) according to its wavelength for output. By the dispersive element 18, the signal light L1 incident onto the dispersive element 18 may be dispersed to plural signal lights L1 according to each wavelength, but here, only a single signal light L1 is shown.

The dispersive element 18 is arranged at the front focus of the condensing element 19. More specifically, the dispersive element 18 is arranged at a position separated from the second lens 16b by the focus distance $f_3$ of the second lens 16b in the x-z plane, and is arranged at a position separated from the condensing lens 19 by the focus distance $f_4$ of the condensing lens 19. As the dispersive element 18, for example, a diffraction grating may be used.

The condensing lens 19 has an optical power in the x-z plane and the y-z plane. Here, the condensing lens 19 outputs the signal light L1 dispersed by the dispersive element 18 toward the light deflection element 15 while collimating the signal light L1 in the x-z plane, for example. The condensing lens 19 condenses the signal light L1 dispersed by the dispersive element 18 in the y-z plane. The condensing lens 19 may be configured by a rotation symmetry lens called a convex spherical lens having an optical power in the x-z plane and the y-z plane.

The light deflection element 15 is arranged as a beam waist position, in the y-z plane, of the signal light L1 output from the condensing lens 19. Accordingly, in the x-z plane and the y-z plane, the arrangement position of the light deflection element 15 may not coincide with the rear focus of the condensing lens 19. The light deflection element 15 deflects the signal light L1 condensed by the condensing lens 19 toward a predetermined output port 13 according to its wavelength. Thus, the light deflection element 15 includes plural light deflection subelements that are arranged along the x-axis direction. Further, the light deflection element 15 independently phase-modulates each signal light L1 dispersed by the dispersive element 18 by plural light deflection subelements thereof, and deflects the phase-modulated signal light L1 toward the output port 13.

As such a light deflection element 15, for example, a liquid crystal on silicon (LCOS) may be used. In this case, among plural pixels arranged in a two-dimensional array formed along the x-axis and the y-axis, a unit of plural pixels (light deflection subelements) arranged in the x-axis direction functions as the plural light deflection subelements that contributes to the deflection of the signal light L1. A micro electro mechanical systems (MEMS) element may also be used as the light deflection element 15.

The signal light L1 deflected by the light deflection element 15 is incident onto a predetermined output port 13 for output through the condensing lens 19, the dispersive element 18, the anamorphic optical system 17 and the relay optical system 16.

Next, a control of a beam waist of the signal light L1 in the wavelength selective switch 1 will be described. Here, for ease of description, terms will be defined as follows. That is, a beam waist position of a light that is incident onto a predetermined lens is referred to as a "front waist position". A distance between the beam waist position of the light incident onto the predetermined lens and the predetermined lens is referred to as a "front waist distance". A beam size of the light at the beam waist position of the light incident onto the predetermined lens is referred to as a "front waist size".

A beam waist position of a light output from the predetermined lens is referred to as a "rear waist position". A distance between the beam waist position of the light output from the predetermined lens and the predetermined lens is referred to as a "rear waist distance". A beam size of the light at the beam waist position of the light output from the predetermined lens is referred to as a "rear waist size". Here, the predetermined lens includes various lenses in wavelength selective switches 1 to 1C, a lens A to be described later, and the like. Further, here, the light includes signal lights L1, L11 and L21, a light L2 to be described later, and the like.

Figure 2:
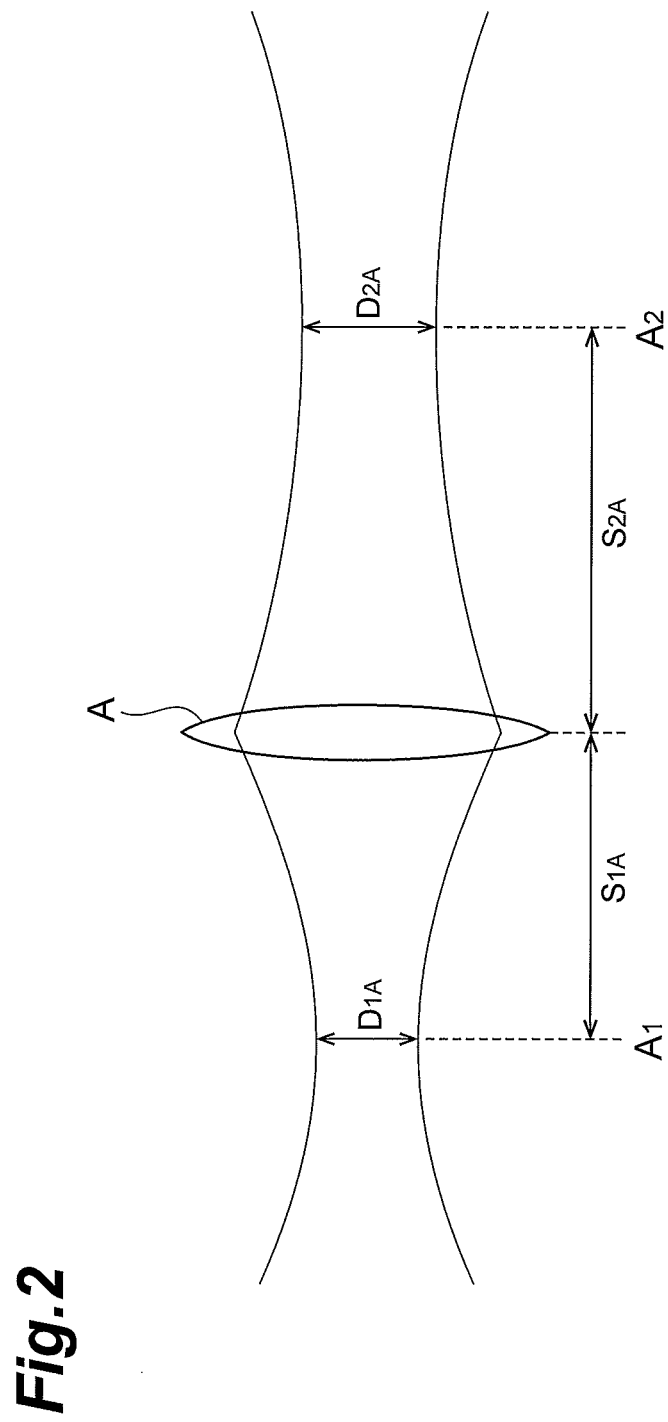
FIG. 2 is a diagram illustrating a Gaussian beam that propagates through a lens.

As shown in FIG. 2, with respect to the light L2 that is a Gaussian beam that propagates through the lens A, the following relation is known (for example, see "Sidney A. Self, "Focusing of spherical Gaussian beams" Applied Optics, vol. 22, No. 5, pp. 658 (1983)").

$$Z_{rA} = \frac{\pi D_{1A}^2}{4\lambda_A} \quad (5)$$

$$S_{2A} = f_A = \frac{S_{1A} - f_A}{\left(1 - \frac{S_{1A}}{f_A}\right)^2 + \left(\frac{Z_{rA}}{f_A}\right)^2} \quad (6)$$

$$D_{2A} = D_{1A} = \frac{1}{\sqrt{\left(1 - \frac{S_{1A}}{f_A}\right)^2 + \left(\frac{Z_{rA}}{f_A}\right)^2}} \quad (7)$$

Here, $f_A$ represents a focus distance of the lens A, and $\lambda_A$ represents a wavelength of the light L2. Further, $S_{1A}$ represents a distance between a beam waist position $A_1$ of the light L2 incident onto the lens A and the lens A (that is, a front waist distance of the lens A). $D_{1A}$ represents a beam size of the light L2 at the beam waist position $A_1$ (that is, a front waist size of the lens A). Further, $S_{2A}$ represents a distance between a beam waist position $A_2$ of the light L2 output from the lens A and the lens A (that is, a rear waist distance of the lens A). $D_{2A}$ represents a beam size of the light L2 at the beam waist position $A_2$ (that is, a rear waist size of the lens A).

According to FIG. 2 and Expressions (5) and (6), it is possible to adjust the rear waist distance $S_{2A}$ by adjusting at least one of the front waist distance $S_{1A}$ and the front waist size $D_{1A}$. In particular, if the front waist distance $S_{1A}$ is set to be equal to the focus distance $f_A$, the rear waist distance $S_{2A}$ is also equal to the focus distance $f_A$. That is, if the beam waist position $A_1$ of the light L2 incident onto the lens A coincides with the front focus of the lens A, it is possible to allow the beam waist position $A_2$ of the light L2 output from the lens A to coincide with the rear focus of the lens A.

Further, according to Expressions (5) and (7), it is possible to adjust the rear waist size $D_{2A}$ by adjusting the front waist distance $S_{1A}$ and the front waist size $D_{1A}$. Schematically, if the front waist size $D_{1A}$ is increased, the rear waist size $D_{2A}$ is decreased. Further, schematically, if the front waist distance $S_{1A}$ is sufficiently increased, the rear waist size $D_{2A}$ is decreased.

In the wavelength selective switch 1 according to the present embodiment, in consideration of the above-described knowledge, the beam waist of the signal light L1 is independently controlled in each of the x-z plane and the y-z plane. As shown in FIG. 1A, in the x-z plane, the first lens 16a of the relay optical system 16 is arranged so that a front waist position $P_x$ of the first lens 16a coincides with the front focus of the first lens 16a. Accordingly, a rear waist position $P_x$ of the first lens 16a coincides with the rear focus of the first lens 16a.

Further, the rear focus of the first lens 16a coincides with the front focus of the second lens 16b. That is, a front waist position $P_x$ of the second lens 16b coincides with the front focus of the second lens 16b. Accordingly, a rear waist position $P_x$ of the second lens 16b coincides with the rear focus of the second lens 16b. Further, the rear focus of the second lens 16b coincides with the front focus of the condensing lens 19. That is, a front waist position $P_x$ of the condensing lens 19 coincides with the front focus of the condensing lens 19. As described above, the relay optical system 16 allows the front waist position $P_x$ of the condensing lens 19 to coincide with the front focus of the condensing lens 19 in the x-z plane.

In other words, the relay optical system 16 functions as a first optical system 21 that matches the beam waist position $P_x$ of the signal light L1 incident onto the condensing lens 19 with the front focus of the condensing lens 19 in the z-axis direction, in the x-z plane. As described above, the first optical system 21 includes the first lens 16a that is the first element having the optical power in the x-z plane and the y-z plane, and the second lens 16b that is the second element having the optical power only in the x-z plane among the x-z plane and the y-z plane.

On the other hand, as shown in FIG. 1B, in the y-z plane, the first lens 16a of the relay optical system 16 is arranged so that a front waist position $P_y$ of the first lens 16a coincides with the front focus of the first lens 16a. Accordingly, the rear waist position $P_y$ of the first lens 16a coincides with the rear focus of the first lens 16a.

However, the second lens 16b does not have the optical power in the y-z plane. Thus, in the y-z plane, the front waist position of the condensing lens 19 becomes the rear waist position $P_y$ of the first lens 16a, regardless of the presence or absence of the second lens 16b. That is, in the y-z plane, a front waist position $P_y$ of the condensing lens 19 does not coincide with the front focus of the condensing lens 19. More specifically, in the y-z plane, the front waist position $P_y$ of the condensing lens 19 is arranged at the front stage of the front focus of the condensing lens 19.

In other words, the second lens 16b of the relay optical system 16 functions as a second optical system 22 that shifts the beam waist position $P_y$ of the signal light L1 incident onto the condensing lens 19 from the front focus of the condensing lens 19 in the z-axis direction, in the y-z plane. Further, the second optical system 22 includes the second lens 16b that is a third element having the optical power only in the x-z plane among the x-z plane and the y-z plane.

Here, on the light deflection element 15, in order to realize a desired aspect ratio in the beam size of the signal light L1, for example, when the beam size of the signal light L1 on the light deflection element 15 in the x-z plane is constant, the beam size of the signal light L1 on the light deflection element 15 in the y-z plane may be adjusted. The beam size of the signal light L1 on the light deflection element 15 in the y-z plane is the beam size in the y-z plane of the signal light L1 output from the condensing lens 19. That is, if the beam size of the signal light L1 output from the condensing lens 19 is adjusted in the y-z plane, it is possible to realize a desired aspect ratio.

Here, a case where the knowledge shown in FIG. 2 and Expressions (5) to (7) is applied to the condensing lens 19 and the signal light L1 in the y-z plane will be considered. A front waist size $D_{1y}$ of the condensing lens 19 in the y-z plane corresponds to the front waist size $D_{1A}$ in Expression (7). A front waist distance $S_{1y}$ of the condensing lens 19 in the y-z plane corresponds to the front waist distance $S_{1A}$ in Expression (7). A rear waist size $D_{2y}$ of the condensing lens 19 in the y-z plane corresponds to the rear waist size $D_{2A}$ in Expression (7).

Accordingly, in order to adjust the rear waist size $D_{2y}$ to realize a desired aspect ratio on the light deflection element 15, as shown in Expressions (5) and (7), at least one of the front waist size $D_{1y}$ and the front waist distance $S_{1y}$ may be adjusted. On the other hand, in the wavelength selective switch 1, as described above, the second optical system 22 allows the front waist position $P_y$ to shift from the front focus of the condensing lens 19 in the y-z plane. That is, the front waist distance $S_{1y}$ is not limited to the focus distance $f_4$ of the condensing lens 19.

That is, in the wavelength selective switch 1, it is possible to adjust both of the front waist size $D_{1y}$ and the front waist distance $S_{1y}$ in the y-z plane, in order to realize a desired aspect ratio. Thus, according to the wavelength selective switch 1, the flexibility of an optical design is improved. On the other hand, for example, when the front waist position of the condensing lens 19 coincides with the front focus of the condensing lens 19 in the y-z plane, the front waist distance $S_{1y}$ is limited to the focus distance $f_4$ of the condensing lens 19. That is, in order to realize a desired aspect ratio, the flexibility for adjusting the front waist distance $S_{1y}$ must be lost.

In the wavelength selective switch 1, in the y-z plane, the front waist position $P_y$ of the condensing lens 19 is arranged at the front stage of the front focus of the condensing lens 19 by the second optical system 22. Thus, in the y-z plane, the signal light L1 incident onto the condensing lens 19 is incident onto the condensing lens 19 while being spread. That is, in the wavelength selective switch 1, the second optical system 22 contributes to improve the aspect ratio.

Here, as described above, in the y-z plane, if the front waist position $P_y$ of the condensing lens 19 shifts from the front focus of the condensing lens 19, the rear waist position of the condensing lens 19 shifts from the rear focus of the condensing lens 19. That is, the rear waist distance $S_{2y}$ (corresponding to the rear waist distance $S_{2A}$ in Expression (6)) of the condensing lens 19 is separated from the focus distance $f_4$ of the condensing lens 19. Accordingly, for example, if the light deflection element 15 is arranged at the rear focus of the condensing lens 19, an optical loss might increase. Thus, reduction of optical loss will be hereinafter considered.

Figure 3:
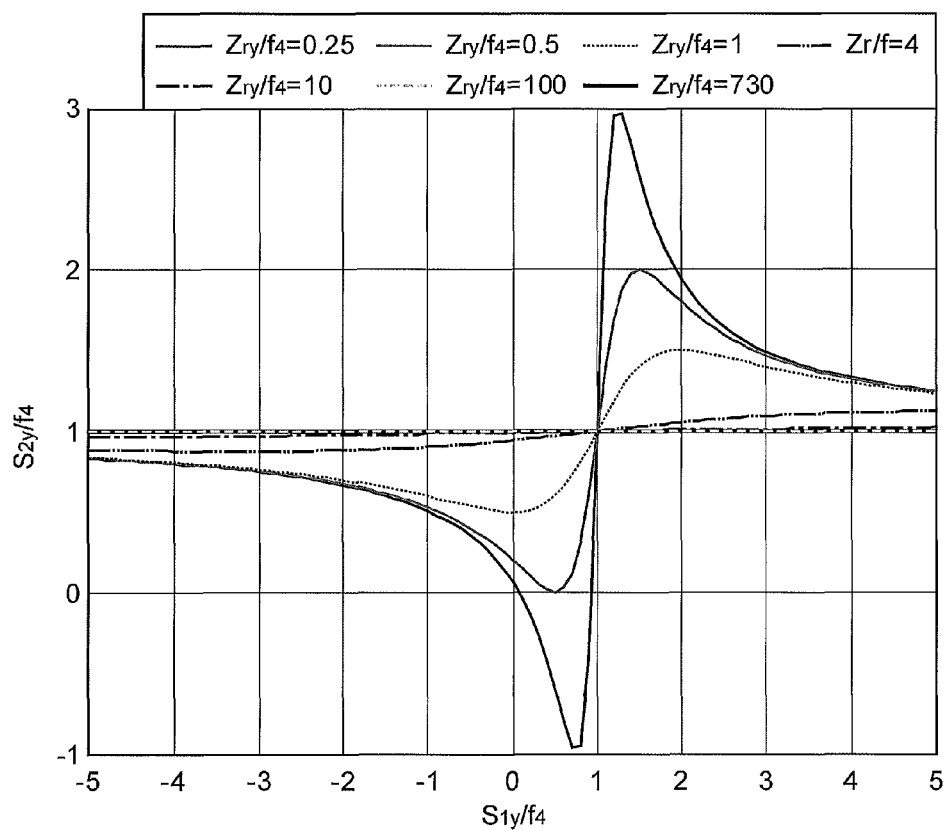
FIG. 3 is a graph illustrating the relationship between a front waist distance and a rear waist distance.

FIG. 3 is a graph illustrating the relationship between the front waist distance and the rear waist distance. The horizontal axis in FIG. 3 represents a value obtained by dividing the front waist distance $S_{1y}$ by the focus distance $f_4$ of the condensing lens 19. Accordingly, "1" on the horizontal axis represents a state where the front waist distance $S_{1y}$ coincides with the focus distance $f_4$. In this way, a value on the horizontal axis represents a divergence degree of the front waist distance $S_{1y}$ and the focus distance $f_4$ (hereinafter, referred to as a "front divergence)".

The vertical axis in FIG. 3 represents a value obtained by dividing the rear waist distance $S_{2y}$ by the focus distance $f_4$ of the condensing lens 19. Accordingly, "1" on the vertical axis represents a state where the rear waist distance $S_{2y}$ coincides with the focus distance $f_4$. That is, a value on the vertical axis represents a divergence degree of the rear waist distance $S_{2y}$ and the focus distance $f_4$ (hereinafter, referred to as a "rear divergence").

Further, the respective graphs shown in FIG. 3 are variations when a third value $V_3$ obtained by dividing a second value $Z_{ry}$ in Expression (2) by the focus distance $f_4$ of the condensing lens 19 as shown in the following Expression (3) is changed. The second value $Z_{ry}$ corresponds to a case where $Z_{rA}$ in Expression (5) is applied to the condensing lens 19 and the signal light L1 in the y-z plane.

$$Z_{ry} = \frac{\pi D_{1y}^2}{4\lambda} \quad (2)$$

$$V_3 = \frac{Z_{ry}}{f_4} \quad (3)$$

As shown in FIG. 3, for example, if the third value $V_3$ is equal to or smaller than 1, the rear divergence ($S_{2y}/f_4$) has a peak when the front divergence ($S_{1y}/f_4$) is present in a region between 0 and 1, and is decreased as the front divergence is increased in a negative direction from the peak. Further, in this case, the rear divergence has a peak when the front divergence ($S_{1y}/f_4$) is present in a region between 1 and 2, and is decreased as the front divergence is increased in a positive direction from the peak.

Accordingly, in order to reduce the optical loss due to the separation of the rear waist distance $S_{2y}$ and the focus distance $f_4$ of the condensing lens 19 (that is, the optical loss generated as the rear waist position of the condensing lens 19 shifts from the rear focus of the condensing lens 19), an absolute value of the front divergence may be increased. To this end, for example, an absolute value of the front waist distance $S_{1y}$ may be increased. In the wavelength selective switch 1 according to the present embodiment, the anamorphic optical system 17 functions as a third optical system 23 that enlarges the distance $S_{1y}$ from the beam waist position $P_y$ of the signal light L1 incident onto the condensing light 19 to the condensing lens 19 in the y-z plane. The third optical system 23 preferably includes one pair of prisms 17a and 17b.

More specifically, as shown in FIG. 1B, the signal light L1 output from the first lens 16a of the relay optical system 16 forms a beam waist between the first lens 16a and the second lens 16b in the y-z plane, and passes through the second lens 16b while being spread from the beam waist, to then be incident onto the third optical system 23 (the anamorphic optical system 17). The signal light L1 incident onto the third optical system 23 is enlarged in the beam size in the y-z plane, and is output from the third optical system 23. Thus, the front waist position $P_y$ of the condensing lens 19 is substantially moved to the position P at the front stage with reference to the beam waist formed by the first lens 16a. That is, the third optical system 23 enlarges the front waist distance $S_{1y}$ in the y-z plane.

As described above, in the wavelength selective switch 1, since the third optical system 23 enlarges the front waist distance $S_{1y}$, the rear divergence is relatively decreased. Thus, the optical loss due to the separation of the rear waist distance $S_{2y}$ and the focus distance $f_4$ of the condensing lens 19 is decreased. Here, it is assumed that the front waist distance $S_{1y}$ is a positive value when being placed at the front stage of the condensing lens 19, and is a negative value when being placed at the rear stage of the condensing lens 19.

On the other hand, as shown in FIG. 3, if the third value $V_3$ is increased, the rear divergence tends to be decreased. As shown in Expressions (2) and (3), the third value $V_3$ could be increased by increasing the second value $Z_{ry}$. In the wavelength selective switch 1, the anamorphic optical system 17 enlarges the second value $Z_{ry}$ by enlarging the front waist size $D_{1y}$. That is, in the wavelength selective switch 1, the anamorphic optical system 17 functions as a fourth optical system 24 that enlarges the second value $Z_{ry}$ in the y-z plane. The fourth optical system 24 includes one pair of prisms 17a and 17b. As described above, in the wavelength selective switch 1, the fourth optical system 24 reduces the rear divergence by enlarging the third value $V_3$ (that is, the second value $Z_{ry}$). Thus, the optical loss is further decreased.

Figure 4:
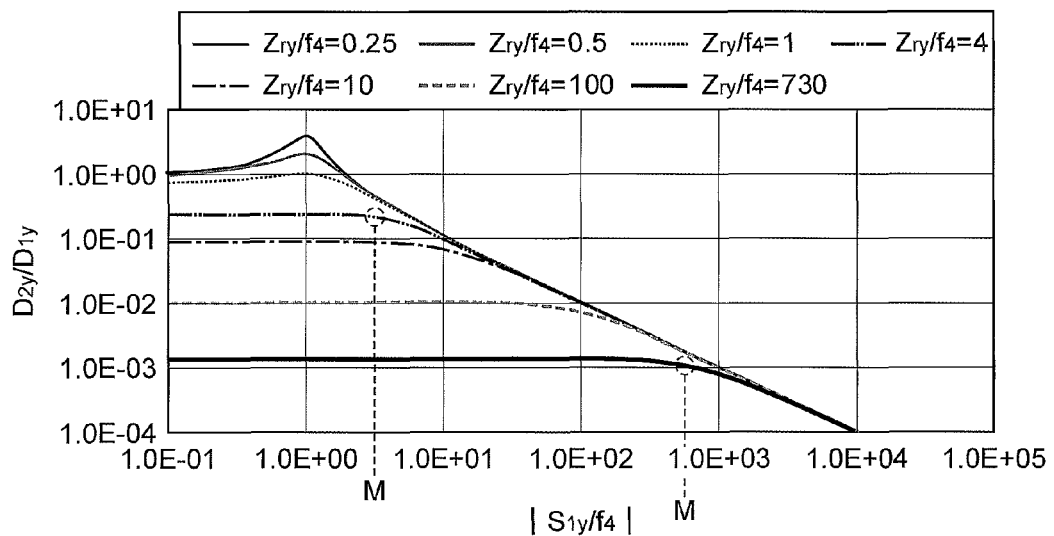
FIG. 4 is a graph illustrating the relationship between a front waist distance and a rear waist size.

Next, the improvement of the flexibility of the optical design will be further considered. FIG. 4 is a graph illustrating the relationship of the front waist distance and the rear waist distance. The horizontal axis in FIG. 4 represents the first value $V_1$ expressed by the following Expression (1). The first value $V_1$ is an absolute value of the front divergence. Further, the vertical axis in FIG. 4 represents a value obtained by dividing the rear waist size $D_{2y}$ by the front waist size $D_{1y}$ (hereinafter, referred to as a "waist size ratio"). Further, respective graphs in FIG. 4 are variations when the third value $V_3$ expressed by the above-mentioned Expression (3) is changed. FIG. 4 is a double logarithmic graph.

$$V_1 = \left| \frac{S_{1y}}{f_4} \right| \quad (1)$$

As shown in FIG. 4, if the third value $V_3$ is equal to or greater than 4, the waist size ratio is constant until the first value $V_1$ reaches a predetermined value from the side of a small value, and is changed (decreased) if the first value $V_1$ is equal to or greater than the predetermined value. The change in the waist size ratio corresponds to the change in the rear waist size $D_{2y}$ if the front waist size $D_{1y}$ is made constant. That is, if the third value $V_3$ is equal to or greater than 4, the first value $V_1$ has a change point M where the rear waist size $D_{2y}$ is changed when the first value $V_1$ is changed. In other words, in the wavelength selective switch 1, in a region smaller than the change point M, the first value $V_1$ could be changed without changing the waist size ratio (the rear waist size $D_{2y}$).

As shown in the above-mentioned Expression (1), the first value $V_1$ is the absolute value of the value obtained by dividing the front waist distance $S_{1y}$ by the focus distance $f_4$. Accordingly, this means that the front waist distance $S_{1y}$ could be changed without changing the rear waist size $D_{2y}$. The rear waist size $D_{2y}$ regulates the aspect ratio of the signal light L1 on the light deflection element 15. Accordingly, in the wavelength selective switch 1, it is possible to improve the flexibility for changing the front waist distance $S_{1y}$ without changing the aspect ratio.

From this point of view, in the wavelength selective switch 1, the first value $V_1$ is smaller than the change point M where the beam size $D_{2y}$ at the beam waist position of the signal light L1 output from the condensing lens 19 is changed when the first value $V_1$ is changed. Thus, as described above, it is possible to improve the flexibility of the optical design. In particular, in the wavelength selective switch 1, the third value $V_3$ is equal to or greater than 4. Thus, the region of the first value $V_1$, where the rear waist size $D_{2y}$ is not changed when the first value $V_1$ is changed, is increased, and then the flexibility of the optical design is further improved. The change point M is about 5 when the third value $V_3$ is 4, and is about 230 when the third value $V_3$ is 730.

Figure 5:
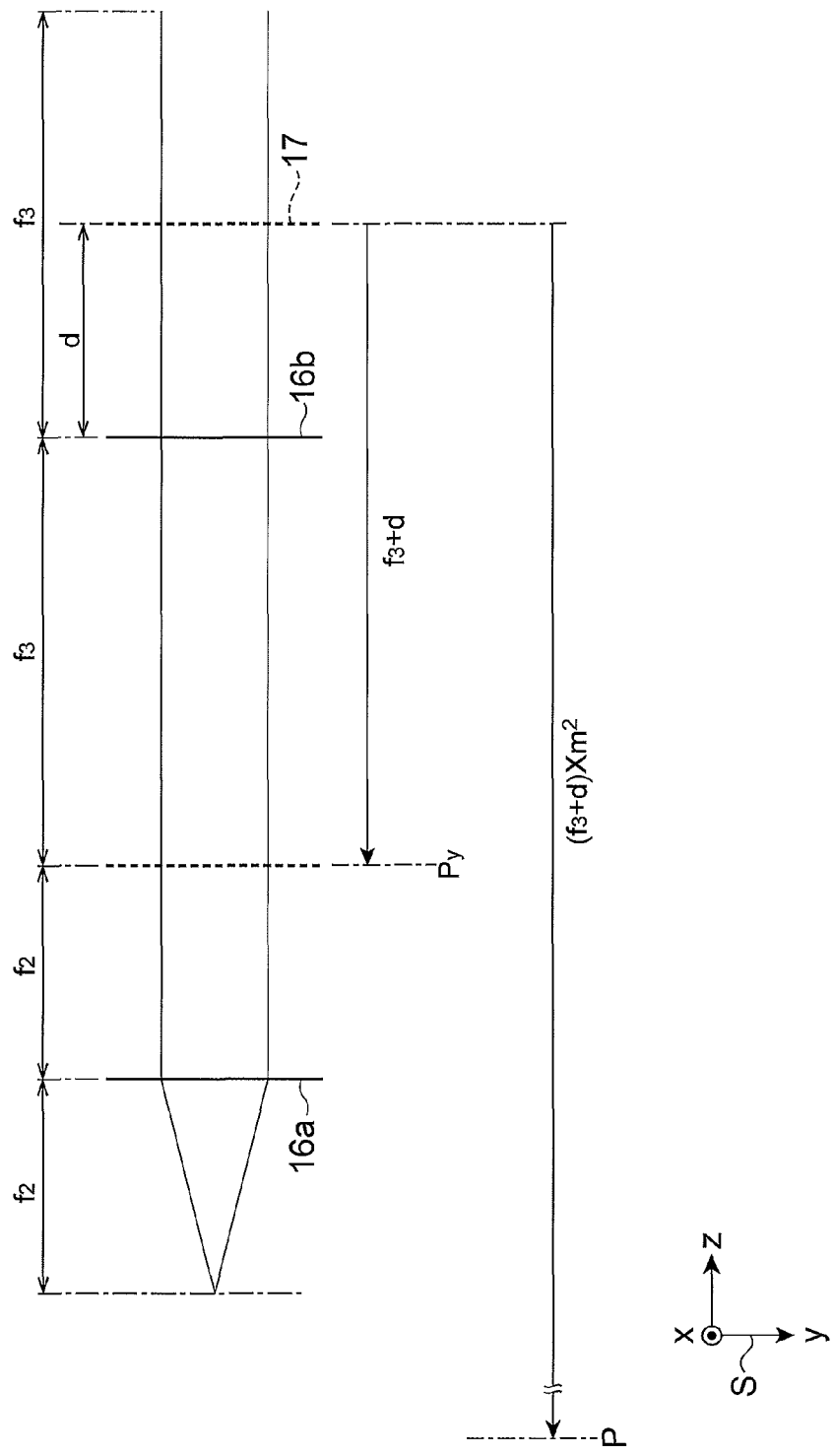
FIG. 5 is a diagram illustrating the relationship between an anamorphic optical system and a beam waist position.

As shown in FIGS. 1B and 5, the distance from the beam waist position (the front waist position) $P_y$ formed by the first lens 16a to the anamorphic optical system 17 (for example, the installation position of the prism 17a) is expressed as $f_3+d$, using the focus distance $f_3$ (in the x-z plane) of the second lens 16b and the distance d from the second lens 16b to the anamorphic optical system 17. Further, the distance from the anamorphic optical system 17 to the substantial beam waist position P is expressed as $(f_3+d) \times m^2$ where an enlargement magnification of the anamorphic optical system 17 is m. That is, as described above, the flexibility for changing the front waist distance $S_{1y}$ corresponds to the flexibility for changing the focus distance $f_3$, the distance d and the magnification m.

Next, the reduction of the optical loss will be further considered. In order to suppress the optical loss at the light deflection element 15, it is preferable that the light deflection element 15 be arranged at the rear waist position of the condensing lens 19 in both of the x-z plane and the y-z plane. However, as described above, in the x-z plane, the rear waist position of the condensing lens 19 coincides with the rear focus of the condensing lens 19, but in the y-z plane, the rear waist position of the condensing lens 19 does not coincide with the condensing lens 19.

That is, the rear waist position of the condensing lens 19 in the x-z plane does not coincide with the rear waist position of the condensing lens 19 in the y-z plane. Thus, in the wavelength selective switch 1, it is difficult to arrange the light deflection element 15 in accordance with the rear waist position of the condensing lens 19 both of in the x-z plane and in the y-z plane.

Thus, in the wavelength selective switch 1, the light deflection element 15 is arranged according to the rear waist position of the condensing lens 19 in the y-z plane. That is, in the x-z plane, the light deflection element 15 shifts from the rear waist position and the rear focus of the condensing lens 19, by the shift amount (hereinafter, referred to as "shift in the optical axis") between the rear waist position of the condensing lens 19 and the rear focus of the condensing lens 19 in the y-z plane. The shift amount in the optical axis direction in the x-z plane is $|S_{2y}-f_4|$.

Figure 6:
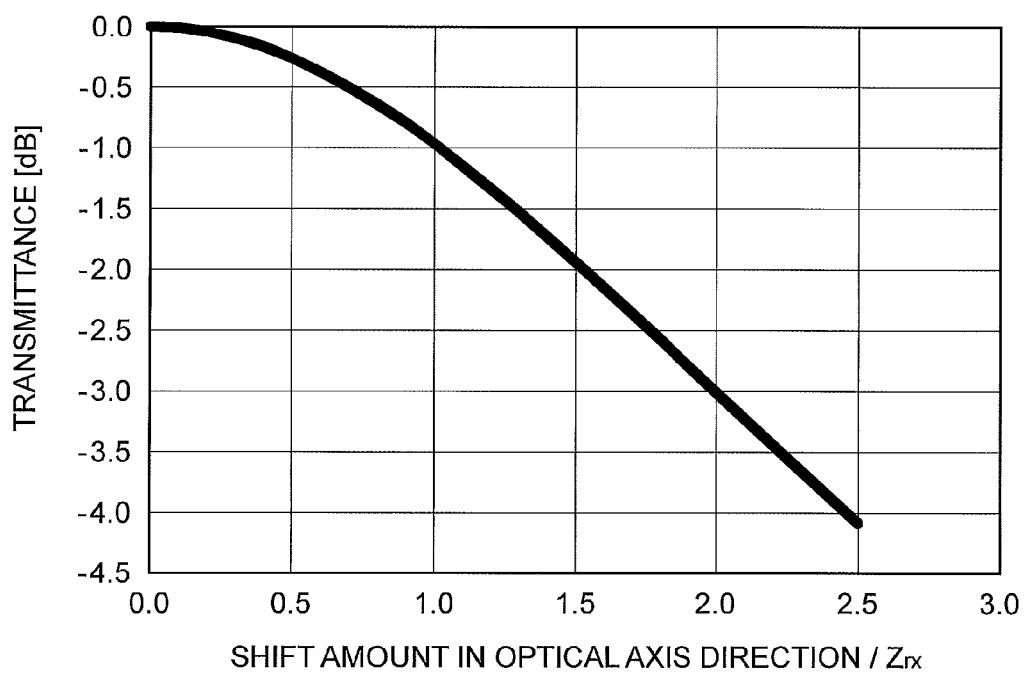
FIG. 6 is a graph illustrating the relationship between a shift amount in an optical axis direction and a transmittance.

FIG. 6 is a graph illustrating the relationship between a shift amount in an optical axis direction and a transmittance. The horizontal axis in FIG. 6 represents a value obtained by dividing the shift amount in the optical axis direction by a fourth value $Z_{rx}$ expressed by the following Expression (8). The vertical axis in FIG. 6 represents a transmittance (loss). $D_{2x}$ in the following Expression (8) represents the rear waist size of the condensing lens 19. As shown in FIG. 6, if a value obtained by dividing the shift amount in the optical axis direction ($|S_{2y}-f_4|$) by the fourth value $Z_{rx}$ is about 1.0, the transmittance is about −1.0 dB. Accordingly, in order to approximate the transmittance to 0 with reference to −1.0 dB, it is necessary to suppress the shift amount in the optical axis direction to the fourth value $Z_{rx}$ or lower. In other words, if the fourth value $Z_{rx}$ is relatively large, the optical loss does not easily exceed 1.0 dB. For example, if $D_{2x}$ is increased, the fourth value $Z_{rx}$ is increased.

$$Z_{rx} = \frac{\pi D_{2x}^2}{4\lambda} \quad (8)$$

On the other hand, in the wavelength selective switch 1, in the y-z plane, the signal light L1 enlarged by the anamorphic optical system 17 is incident onto the condensing lens 19, while in the x-z plane, the signal light L1 is incident onto the condensing lens 19 without being enlarged by the anamorphic optical system 17. Thus, the rear waist size $D_{2x}$ of the condensing lens 19 in the x-z plane is greater than the rear waist size $D_{2y}$ of the condensing lens 19 in the y-z plane.

Accordingly, the fourth value $Z_{rx}$ regulated by the rear waist size $D_{2x}$ in the x-z plane is relatively greater than a value that is similarly regulated by the rear waist size $D_{2y}$ in the y-z plane. That is, in the wavelength selective switch 1, in the y-z plane in which the relatively small rear waist size $D_{2y}$ is given, the shift in the optical axis direction is avoided by arranging the light deflection element 15 at the rear waist position of the condensing lens 19, while the shift in the optical axis direction is allowed in the x-z plane in which the relatively large rear waist size $D_{2x}$ is given. Thus, in the wavelength selective switch 1, the optical loss is not easily increased (the optical loss may be reduced). In particular, in the wavelength selective switch 1, by satisfying the following Expression (4), the optical loss may be suppressed to 1.0 dB or lower.

$$|S_{2y} - f_4| \leq \frac{\pi D_{2x}^2}{4\lambda} \quad (4)$$

As described above, according to the wavelength selective switch 1, in order to realize a desired aspect ratio, the flexibility of the optical design may be improved while reducing the optical loss. Further, it is possible to introduce an optical system for reducing the optical loss because of the improved flexibility of the optical design.

Second Embodiment

Figure 7:
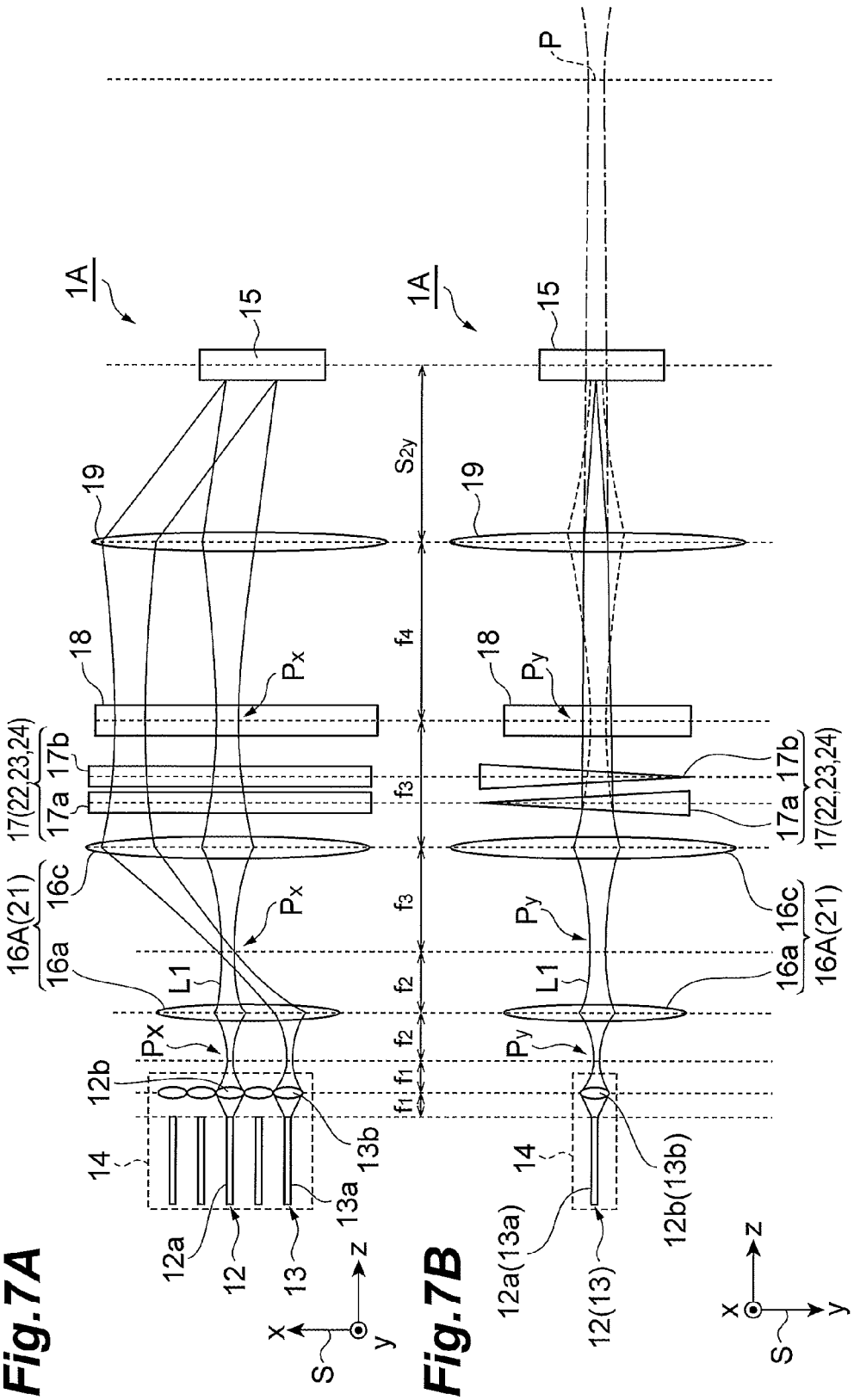
FIGS. 7A and 7B are diagrams schematically illustrating a configuration of a second embodiment of a wavelength selective switch according to one aspect of the present invention.

FIGS. 7A and 7B are diagrams schematically illustrating a configuration of a second embodiment of a wavelength selective switch according to one aspect of the present invention. FIG. 7A is a diagram when seen in the y-axis direction, which schematically illustrates a configuration of the wavelength selective switch in the x-z plane. FIG. 7B is a diagram when seen in the x-axis direction, which schematically illustrates a configuration of the wavelength selective switch in the y-z plane. As shown in FIGS. 7A and 7B, a wavelength selective switch 1A according to the present embodiment is different from the wavelength selective switch 1 in that a relay optical system 16A is provided instead of the relay optical system 16.

The relay optical system 16A includes a second lens 16c instead of the second lens 16b. The second lens 16c has an optical power at least in the x-z plane. Here, the second lens 16c has an optical power in the x-z plane and the y-z plane. The second lens 16c is a rotation symmetry lens called a convex spherical lens, for example.

The second lens 16c is arranged so that a front focus of the second lens 16c approximately coincides with a rear focus of the first lens 16a. Further, the second lens 16c is arranged so that a rear focus of the second lens 16c approximately coincides with a front focus of the collimating lens 19. That is, the second lens 16c is arranged at a position separated from the first lens 16a by a focus distance $f_2$ of the first lens 16a and a focus distance $f_3$ of the second lens 16c, that is, at a position separated from the condensing lens 19 by the focus distance $f_3$ of the second lens 16c and a focus distance $f_4$ of the condensing lens 19.

Next, a control of a beam waist of a signal light L1 in the wavelength selective switch 1A will be described. In the wavelength selective switch 1A according to the present embodiment, as shown in FIG. 7A, in the x-z plane, the first lens 16a of the relay optical system 16A is arranged so that the front waist position $P_x$ of the first lens 16a coincides with the front focus of the first lens 16a. Accordingly, the rear waist position $P_x$ of the first lens 16a coincides with the rear focus of the first lens 16a.

Further, the rear focus of the first lens 16a coincides with the front focus of the second lens 16c. That is, a front waist position $P_x$ of the second lens 16c coincides with the front focus of the second lens 16c. Accordingly, a rear waist position $P_x$ of the second lens 16c coincides with the rear focus of the second lens 16c. Further, the rear focus of the second lens 16c coincides with the front focus of the condensing lens 19. That is, the front waist position $P_x$ of the condensing lens 19 coincides with the front focus of the condensing lens 19. As described above, the relay optical system 16A allows the front waist position $P_x$ of the condensing lens 19 to coincide with the front focus of the condensing lens 19, in the x-z plane.

In other words, in the x-z plane, the relay optical system 16A functions as the first optical system 21 that matches the beam waist position $P_x$ of the signal light L1 incident onto the condensing lens 19 with the front focus of the condensing lens 19 in the z-axis direction. As described above, the first optical system 21 includes the first lens 16a that is the first element having the optical power in the x-z plane and the y-z plane, and the second lens 16c that is the second element having the optical power in the x-z plane and the y-z plane.

Similarly, as shown in FIG. 7B, in the y-z plane, the first lens 16a is arranged so that the front waist position $P_y$ of the first lens 16a coincides with the front focus of the first lens 16a. Accordingly, the rear waist position $P_y$ of the first lens 16a coincides with the rear focus of the first lens 16a. Further, the rear focus of the first lens 16a coincides with the front focus of the second lens 16c. That is, the front waist position $P_y$ of the second lens 16c coincides with the front focus of the second lens 16c. However, as described later, since a rear waist position of the second lens 16c shifts by the anamorphic optical system 17, the position does not coincide with the rear focus of the second lens 16c.

More specifically, the signal light L1 output from the second lens 16c is condensed by the second lens 16c, and is incident onto the anamorphic optical system 17 while being reduced in its beam size. Further, the signal light L1 incident onto the anamorphic optical system 17 is reduced in the degree of the beam size reduction by the anamorphic optical system 17. Accordingly, the beam waist of the signal light L1 output from the second lens 16c is placed at the rear stage (at a position P to be described later) with reference to the rear waist position $P_y$ of the second lens 16c when the anamorphic optical system 17 is not provided.

That is, the rear waist position $P_y$ of the second lens 16c shifts from the rear focus of the second lens 16c by the anamorphic optical system 17. In other words, the anamorphic optical system 17 functions as the second optical system 22 that shifts the beam waist position $P_y$ of the signal light L1 incident onto the condensing lens 19 from the front focus of the condensing lens 19 in the z-axis direction, in the y-z plane. Further, the second optical system 22 consists of one pair of prisms 17a and 17b.

As described above, in the wavelength selective switch 1A, the second optical system 22 allows the front waist position $P_y$ to shift from the front focus of the condensing lens 19 in the y-z plane. That is, the front waist distance $S_{1y}$ is not limited to the focus distance $f_4$ of the condensing lens 19. Accordingly, in the wavelength selective switch 1, in order to realize a desired aspect ratio, it is possible to adjust both of the front waist size $D_{1y}$ and the front waist distance $S_{1y}$ of the condensing lens 19, in the y-z plane. Thus, according to the wavelength selective switch 1A, the flexibility of the optical design is improved.

In the wavelength selective switch 1A, in the y-z plane, the front waist position $P_y$ of the condensing lens 19 is placed at the rear stage with reference to the front focus of the condensing lens 19 by the second optical system 22. Thus, in the y-z plane, it is possible to disperse the signal light L1 by the dispersive element 18 at a stage where the spread of the signal light is relatively small. Accordingly, the dispersive element 18 may be miniaturized.

Here, as described above, in the wavelength selective switch 1A, in the y-z plane, the rear waist distance $S_{2y}$ of the condensing lens 19 is similarly separated from the focus distance $f_4$ of the condensing lens 19. Due to this separation, for example, when the light deflection element 15 is arranged at the rear focus of the condensing lens 19, an optical loss might increase. Thus, in the wavelength selective switch 1A, in order to reduce the optical loss due to the separation of the rear waist distance $S_{2y}$ and the focus distance $f_4$ of the condensing lens 19, an absolute value of the front divergence is similarly increased.

Thus, the absolute value of the front waist distance $S_{1y}$ is increased. In the wavelength selective switch 1A according to the present embodiment, the anamorphic optical system 17 functions as the third optical system 23 that enlarges the distance $S_{1y}$ from the beam waist position $P_y$ of the signal light L1 incident onto the condensing light 19 to the condensing lens 19 in the y-z plane. The third optical system 23 includes one pair of prisms 17a and 17b.

More specifically, as shown in FIG. 7B, in the y-z plane, the signal light L1 incident onto the second lens 16c of the relay optical system 16 is condensed by the second lens 16c. Accordingly, the signal light L1 is incident onto the third optical system 23 (the anamorphic optical system 17) while being reduced in its beam size. Further, the signal light L1 is reduced in the degree of the beam size reduction by the third optical system 23. Thus, the front waist position of the condensing lens 19 is substantially moved to the rear stage position P with reference to the front waist position $P_y$ when the third optical system 23 is not provided.

That is, the third optical system 23 enlarges the front waist distance $S_{1y}$ in the y-z plane. As described above, in the wavelength selective switch 1A, since the third optical system 23 enlarges the front waist distance $S_{1y}$, the rear divergence is relatively reduced (see FIG. 3). Thus, the optical loss due to the separation of the rear waist distance $S_{2y}$ and the focus distance $f_4$ of the condensing lens 19 is reduced.

On the other hand, in the wavelength selective switch 1A, the anamorphic optical system 17 enlarges the second value $Z_{ry}$ shown in the above-mentioned Expression (2) by enlarging the front waist size $D_{1y}$. That is, in the wavelength selective switch 1A, the anamorphic optical system 17 functions as the fourth optical system 24 that enlarges the second value $Z_{ry}$ in the y-z plane. The fourth optical system 24 includes one pair of prisms 17a and 17b. As described above, in the wavelength selective switch 1A, the fourth optical system 24 reduces the rear divergence by enlarging the third value $V_3$ (that is, the second value $Z_{ry}$). Thus, the optical loss may be reduced.

Here, as described above, if the third value $V_3$ shown in the above-mentioned Expression (3) is equal to or greater than 4, the waist size ratio is constant until the first value $V_1$ shown in the above-mentioned Expression (1) reaches the predetermined value from the side of the small value, and is changed (decreased) if the first value $V_1$ is equal to or greater than the predetermined value (see FIG. 4). That is, as described above, if the third value $V_3$ is equal to or greater than 4, the first value $V_1$ has the change point M where the rear waist size $D_{2y}$ is changed when the first value $V_1$ is changed. In other words, in the wavelength selective switch 1A, by making the first value $V_1$ greater than the change point M, the rear waist size $D_{2y}$ may be reduced.

The rear waist size $D_{2y}$ regulates the aspect ratio of the signal light L1 on the light deflection element 15. Accordingly, in the wavelength selective switch 1A, the aspect ratio may be improved. From this point of view, in the wavelength selective switch 1A, the first value $V_1$ is greater than the change point M where the beam size $D_{2y}$ at the beam waist position of the signal light L1 output from the condensing lens 19 may change when the first value $V_1$ is changed. Thus, the aspect ratio may be improved as described above.

As shown in the above-mentioned Expression (1), the first value $V_1$ is regulated by the front waist distance $S_{1y}$ of the condensing lens 19. Further, the aspect ratio is regulated by the beam size of the signal light L1 on the light deflection element 15 in the y-z plane, if the beam size of the signal light L1 on the light deflection element 15 in the x-z plane is made constant. Here, with respect to the relationship between the front waist distance $S_{1y}$ of the condensing lens 19 and the beam size of the signal light L1 on the light deflection element 15 in the y-z plane, examples of calculation results are shown in FIGS. 9 and 10.

Figure 9:
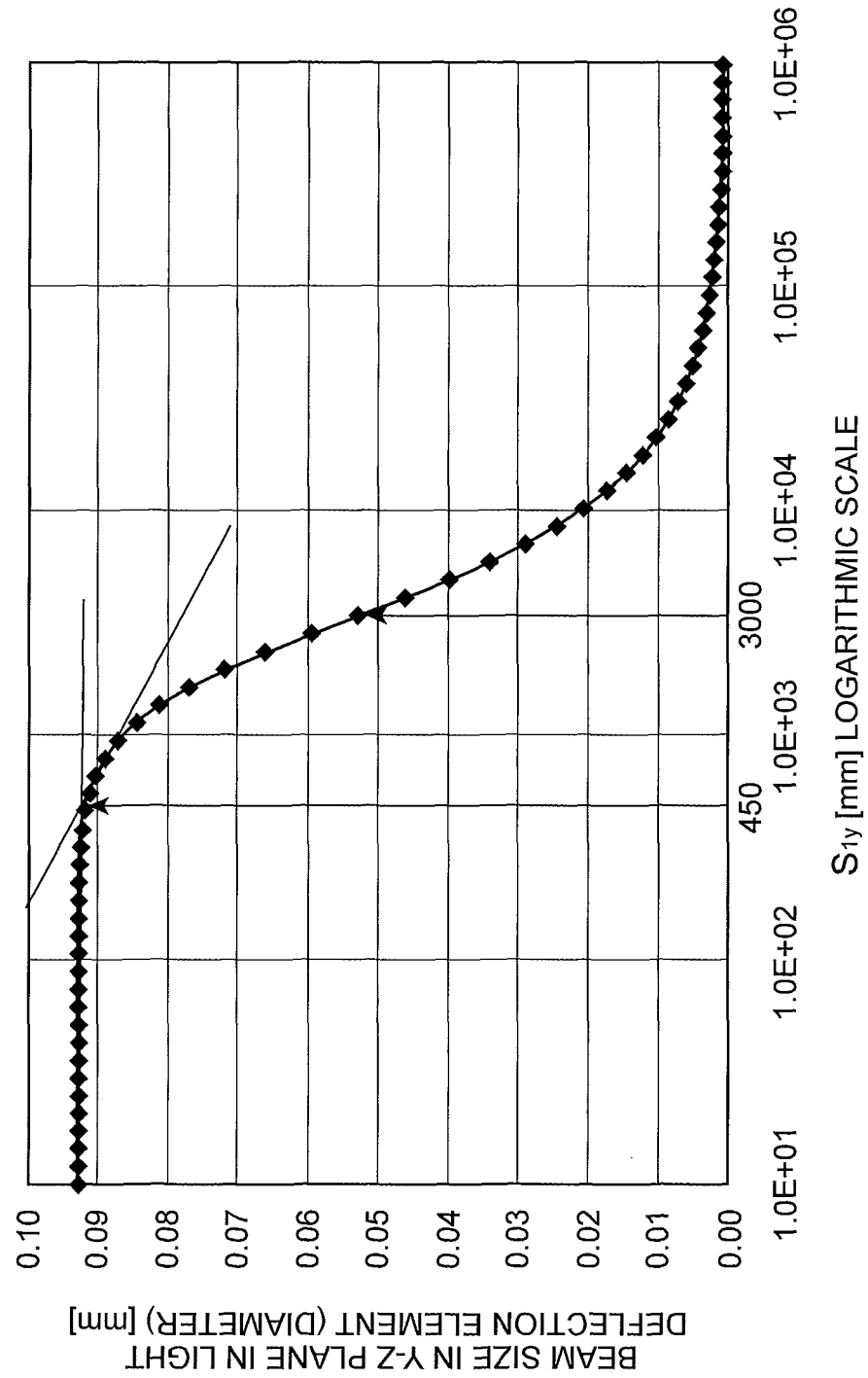
FIG. 9 is a graph illustrating the relationship between a distance from a beam waist position to a condensing lens and a beam size in a light deflection element.

The calculation shown in FIG. 9 is performed using the following conditions.

Prisms (Anamorphic Optical System 17)
  Magnification: octuple (two prisms (prisms 17a and 17b))
  Glass material: Si
Lenses
  Focus distance f1 of the collimating lens 12b: 1.4 mm
  Focus distance f2 of the first lens 16a: 65 mm
  Focus distance f3 of the second lens 16c: 65 mm
  Focus distance f4 of the condensing lens 19: 100 mm
  Beam waist diameter: 0.2654 mm
[Wavelength]
  Wavelength of the signal light L1: 0.001548 mm As shown in FIG. 9, the beam size starts to be gradually decreased when the absolute value of the front waist distance $S_{1y}$ of the condensing lens 19 is about 450 mm. That is, the front waist distance $S_{1y}$ that regulates the change point M is about 450 mm. Further, when the front waist distance $S_{1y}$ is about 3000 mm, it is possible to set the aspect ratio in the light deflection element 15 to about 30.

Figure 10:
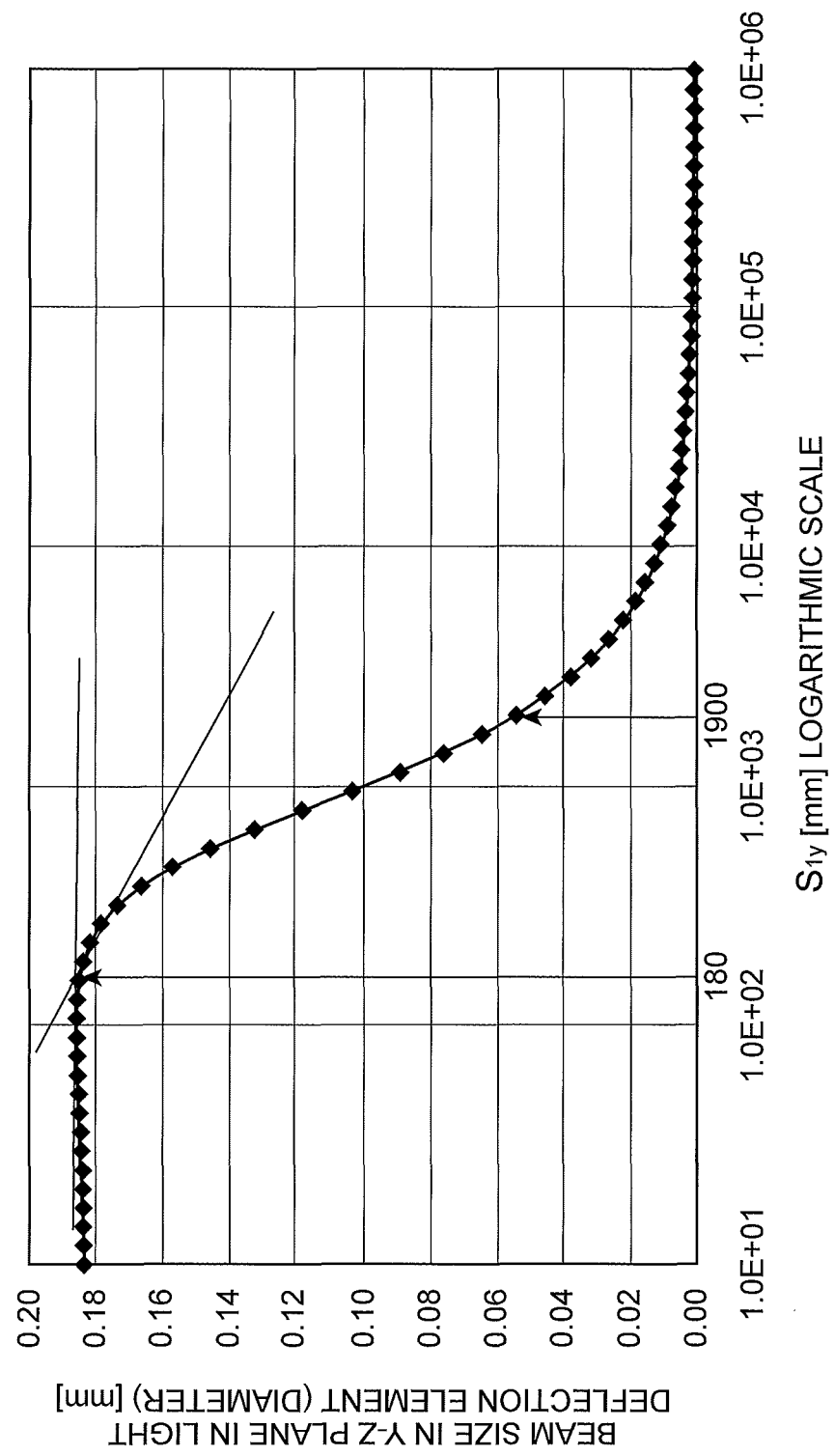
FIG. 10 is a graph illustrating the relationship between a distance from a beam waist position to a condensing lens and a beam size in a light deflection element.

The calculation shown in FIG. 10 is performed using the following conditions.

Prisms (Anamorphic Optical System 17)
  Magnification: octuple (two prisms (prisms 17a and 17b))
  Glass material: Si
Lenses
  Focus distance f1 of the collimating lens 12b: 0.7 mm
  Focus distance f2 of the first lens 16a: 65 mm
  Focus distance f3 of the second lens 16c: 65 mm
  Focus distance f4 of the condensing lens 19: 100 mm
  Front waist size $D_{1y}$ of the condensing lens 19: 0.133 mm
[Wavelength]
  Wavelength of the signal light L1: 0.001548 mm As shown in FIG. 10, the beam size starts to be gradually decreased when the absolute value of the front waist distance $S_{1y}$ of the condensing lens 19 is about 180 mm. That is, the front waist distance $S_{1y}$ that regulates the change point M is about 180 mm. Further, when the front waist distance $S_{1y}$ is about 1900 mm, it is possible to set the aspect ratio in the light deflection element 15 to about 30.

Figure 8:
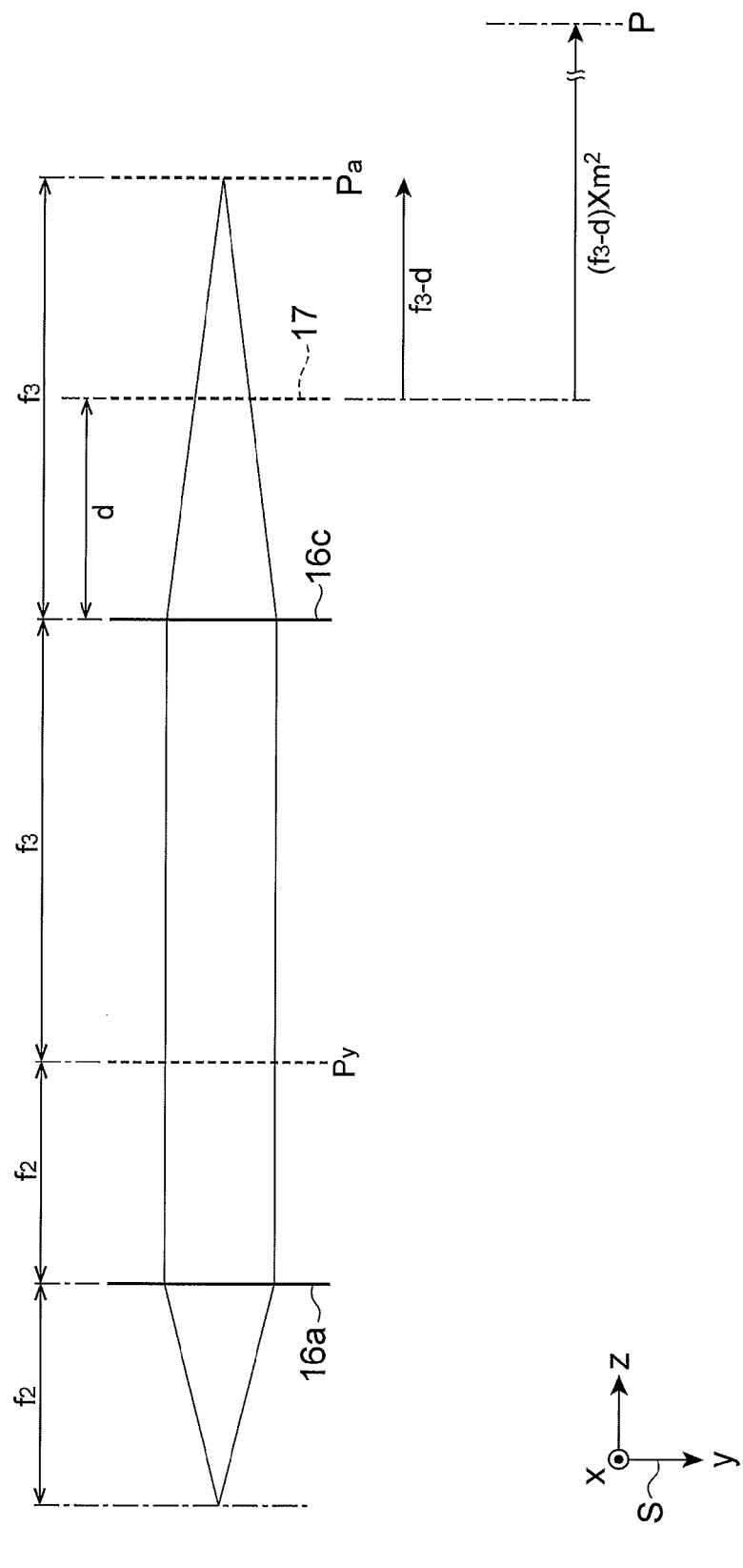
FIG. 8 is a diagram illustrating the relationship between an anamorphic optical system and a beam waist position.

As shown in FIGS. 7B and 8, the distance from the rear waist position $P_y$ of the second lens 16c when the anamorphic optical system 17 is not provided to the anamorphic optical system 17 is expressed as $f_3-d$, using the focus distance $f_3$ of the second lens 16c and the distance d from the second lens 16c to the anamorphic optical system 17. Further, the distance from the anamorphic optical system 17 to the substantial beam waist position P is expressed as $(f_3-d) \times m^2$ where the enlargement magnification of the anamorphic optical system 17 is m. That is, as described above, the flexibility for changing the front waist distance $S_{1y}$ corresponds to the flexibility for changing the focus distance $f_3$, the distance d and the magnification m.

Here, in the wavelength selective switch 1A, similarly to the wavelength selective switch 1, the light deflection element 15 is arranged in accordance with the rear waist position of the condensing lens 19 in the y-z plane. Further, the wavelength selective switch 1A satisfies the above-mentioned Expression (4). Thus, the optical loss may be suppressed to 1.0 dB or lower.

Third Embodiment

Figure 11:
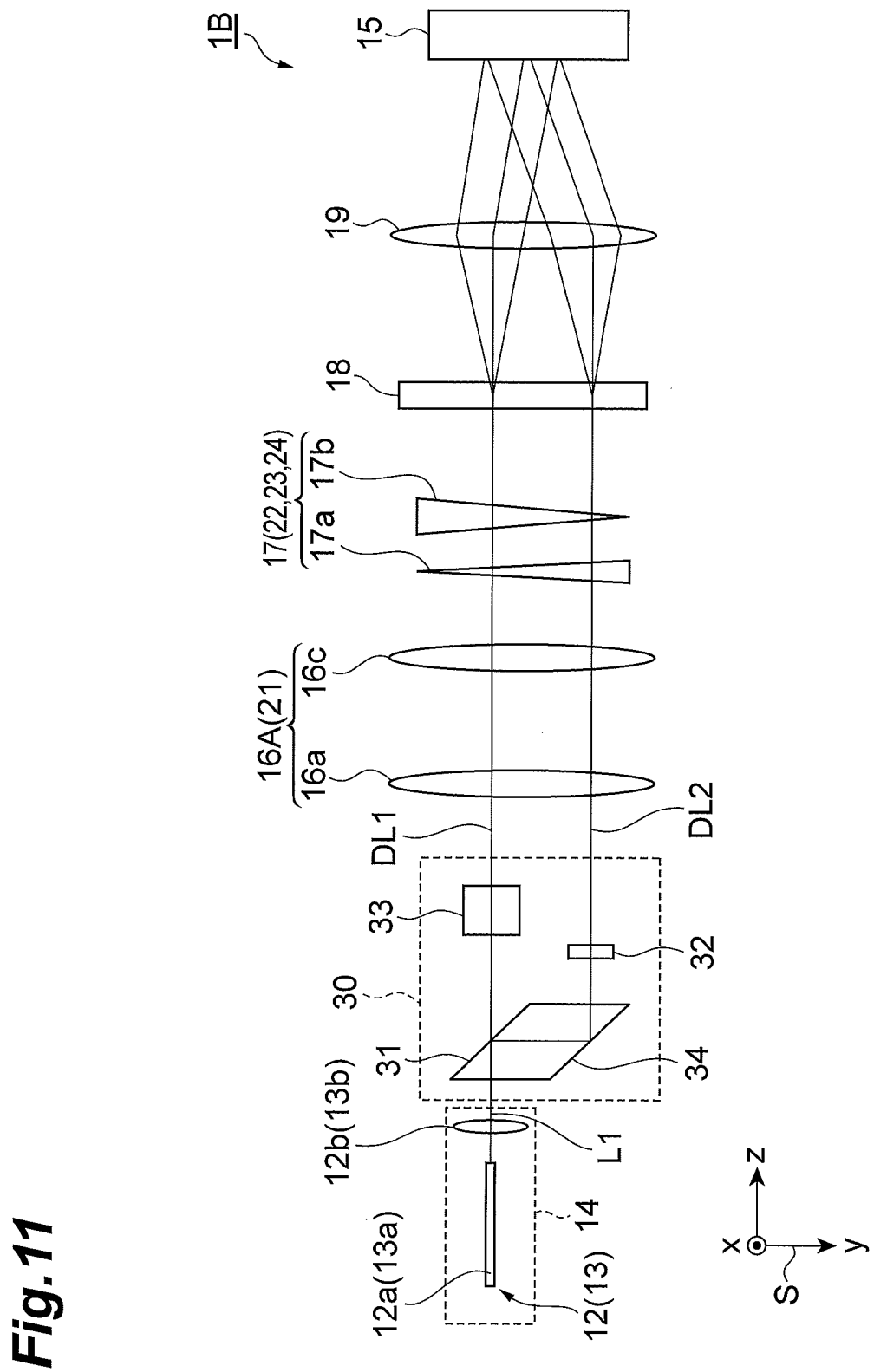
FIG. 11 is a diagram schematically illustrating a configuration of a third embodiment of a wavelength selective switch according to one aspect of the present invention.

FIG. 11 is a diagram schematically illustrating a configuration of a third embodiment of a wavelength selective switch according to one aspect of the present invention. In particular, FIG. 11 is a diagram when seen in the x-axis direction, which schematically illustrates the wavelength selective switch in the y-z plane. As shown in FIG. 11, a wavelength selective switch 1B according to the present embodiment is different from the wavelength selective switch 1A in that a polarization diversity module 30 is further provided. The polarization diversity module 30 is arranged at a front stage of the relay optical module 16A.

The polarization diversity module 30 includes a polarization beam splitter 31, a wavelength plate (polarization rotation element) 32, and an optical path adjustment element 33. The polarization beam splitter 31 separates a signal light L1 in the y-axis direction according to a polarization direction (s/p polarization). The wavelength plate 32 matches a polarization direction of a signal light DL2 among the signal lights DL1 and DL2 separated by the polarization beam splitter 31 with a polarization direction of the other signal light DL1. The optical path adjustment element 33 matches an optical path of the signal light DL1 with an optical path of the other signal light DL2.

In the polarization diversity module 30, the signal light DL2 separated by the polarization beam splitter 31 is reflected by a mirror 34, and then is incident onto the wavelength plate 32. As described above, the wavelength selective switch 1B includes the polarization diversity module 30, to thereby reduce a polarization dependent loss. In particular, by arranging the polarization diversity module 30 at the front stage of the relay optical system 16A, the polarization diversity module 30 may be miniaturized.

Here, in the wavelength selective switch 1B that includes the above-described polarization diversity module 30, the signal light DL1 and the signal light DL2 travel on different paths. The paths through which the signal lights DL1 and DL2 pass are reverse in their advancing paths and returning paths. For example, the signal light DL1 advances toward the light deflection element 15 on an upper path in the figure, and returns from the light deflection element 15 on a lower path in the figure. Here, in the wavelength selective switch 1B, since the above-described functions of the relay optical system 16A and the anamorphic optical system 17 are important, it is necessary to arrange optical path lengths in the advancing paths and the returning paths of the signal lights DL1 and DL2. Thus, for example, it is effective to arrange the optical path adjustment element 33 formed by a cylindrical lens or a prism assembly.

Fourth Embodiment

Figure 12:
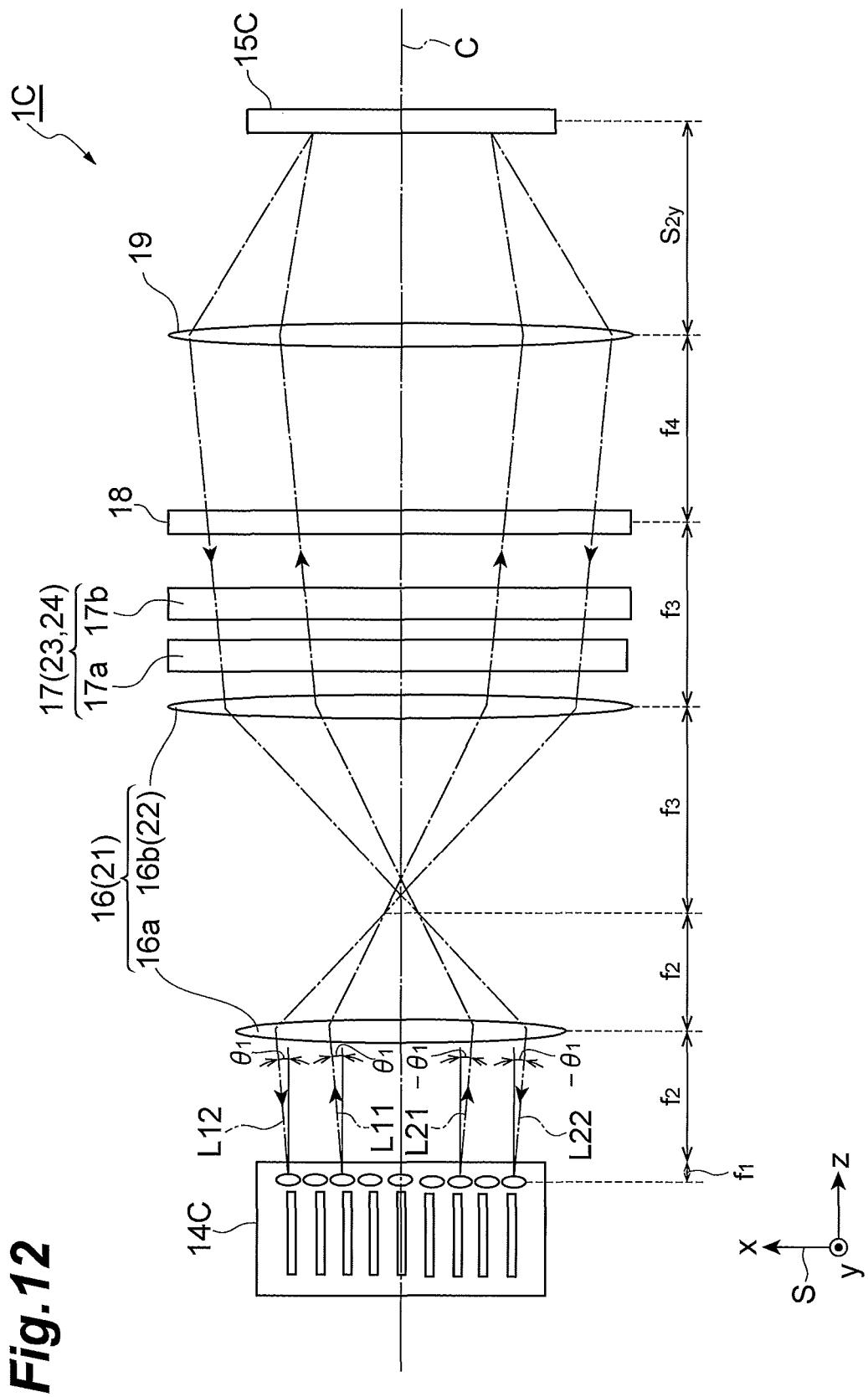
FIG. 12 is a diagram schematically illustrating a configuration of a fourth embodiment of a wavelength selective switch according to one aspect of the present invention.
Figure 13:
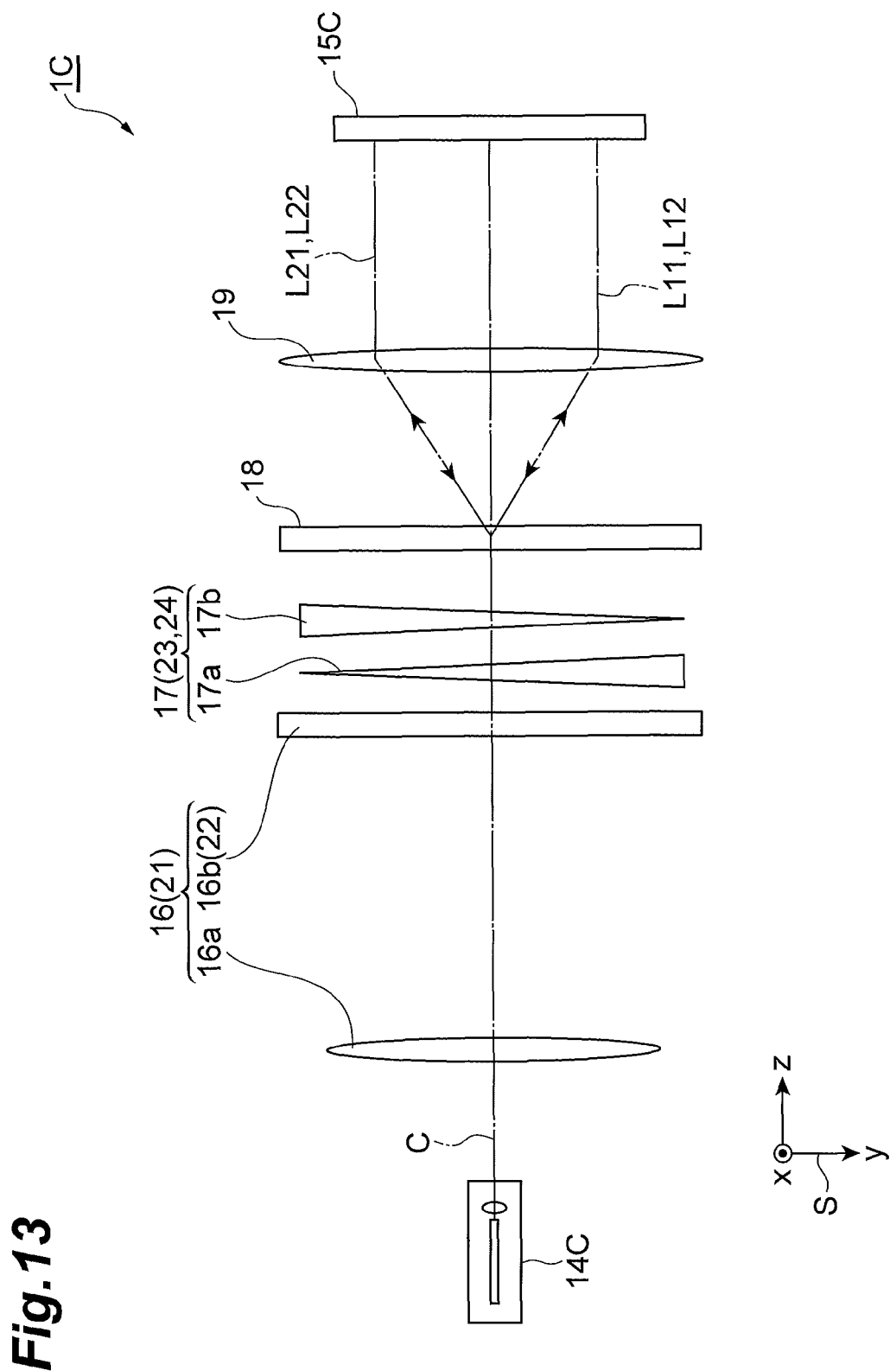
FIG. 13 is a diagram schematically illustrating a configuration of a fourth embodiment of a wavelength selective switch according to one aspect of the present invention.

FIGS. 12 and 13 are diagrams schematically illustrating a configuration of a fourth embodiment of a wavelength selective switch according to one aspect of the present invention. In particular, FIG. 12 is a diagram when seen in the y-axis direction, which schematically illustrates the wavelength selective switch in the x-z plane. FIG. 13 is a diagram when seen in the x-axis direction, which schematically illustrates the wavelength selective switch in the y-z plane. As shown in FIGS. 12 and 13, a wavelength selective switch 1C according to the present embodiment is different from the wavelength selective switch 1 in that a port array 14C is provided instead of the port array 14 and a light deflection element 15C is provided instead of the light deflection element 15.

The port array 14C, the relay optical system 16, the anamorphic optical system 17, the dispersive element 18, the condensing lens 19 and the light deflection element 15C are arranged on a predetermined axis line C (equivalent to the optical axis direction in the embodiment). The predetermined axis line C is an axis line that extends in the z-axis direction, for example. In FIGS. 12 and 13, the predetermined axis line C is linearly drawn, but for example, the predetermined axis line C may be bent as a reflecting mirror or the like is arranged on the way.

Figure 14:
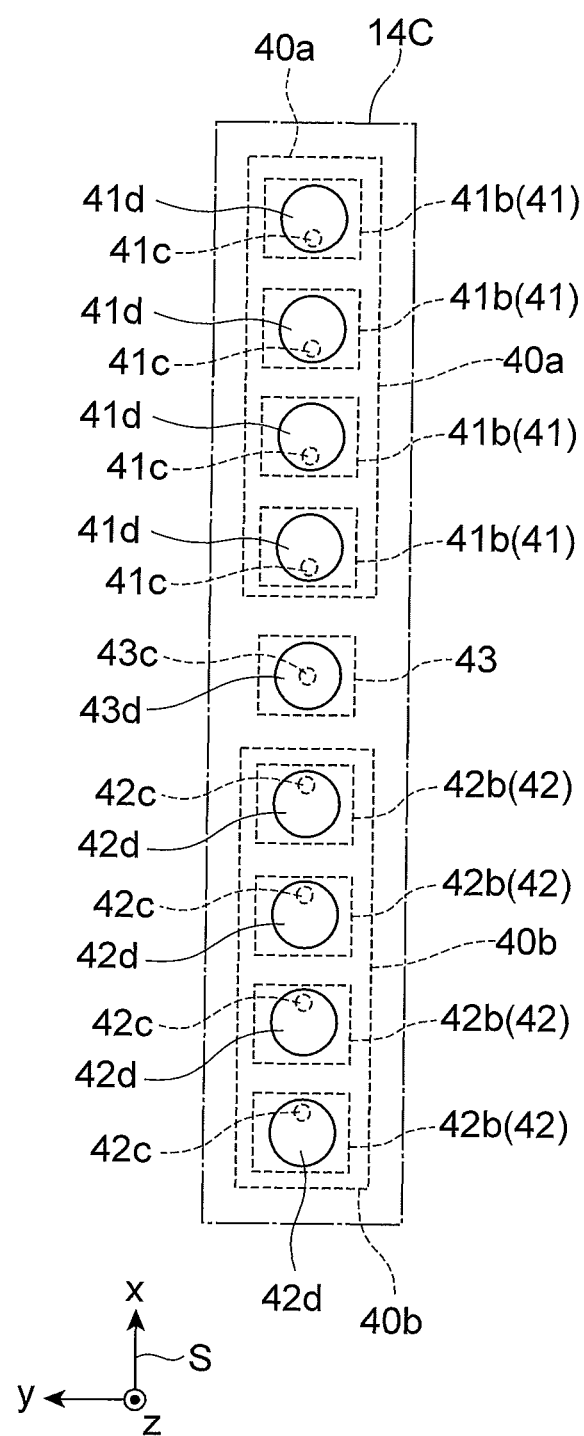
FIG. 14 is a diagram illustrating a configuration of a port array seen from a predetermined axis line direction.
Figure 15:
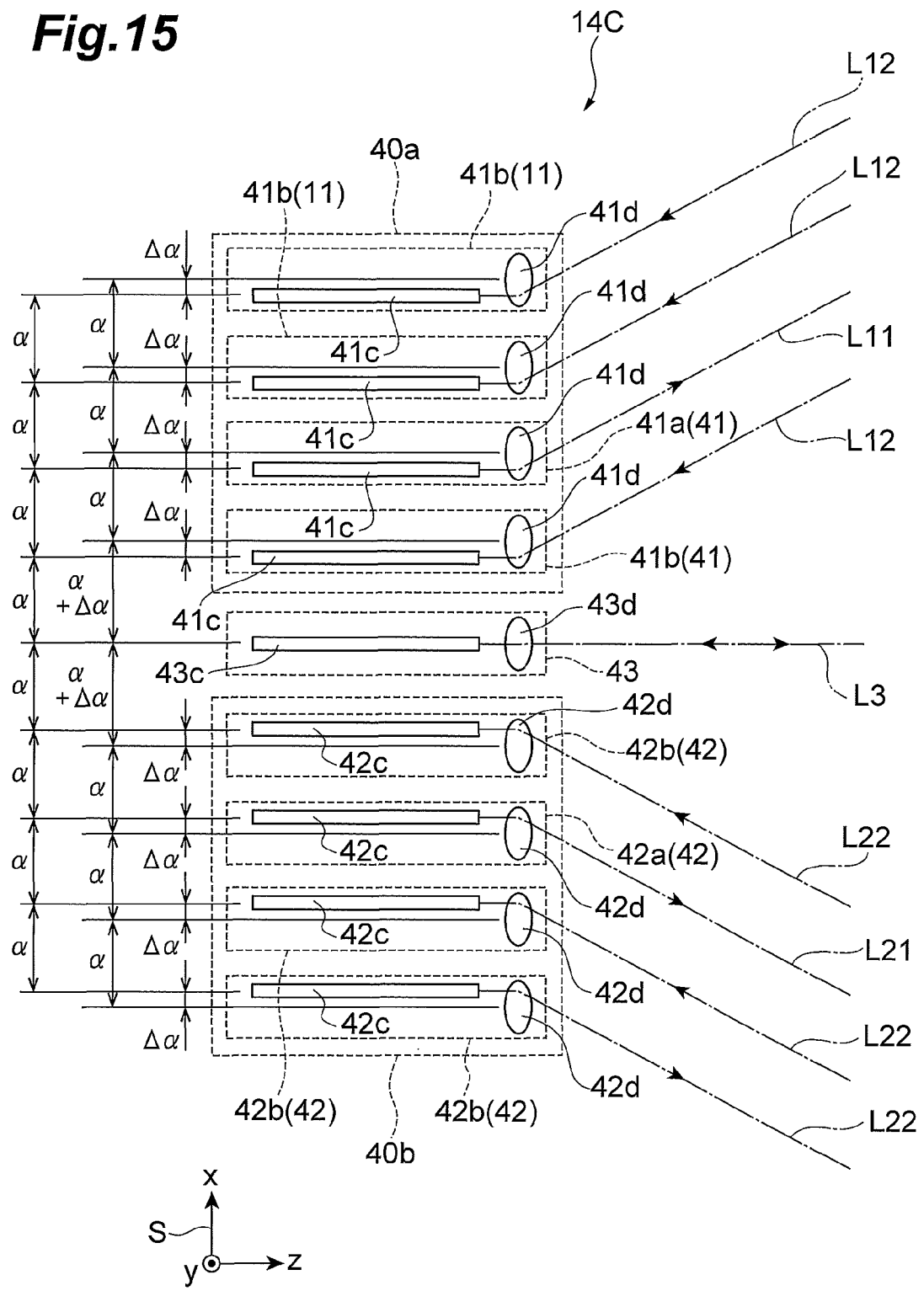
FIG. 15 is a side view illustrating a configuration of a port array seen from a y-axis direction.

FIG. 14 is a diagram illustrating a configuration of the port array 14C seen in the direction of the predetermined axis line C (z-axis direction). Further, FIG. 15 is a side view illustrating a configuration of the port array 14C seen in the y-axis direction. As shown in FIGS. 14 and 15, the port array 14C has a first part 40a and a second part 40b. The first part 40a and the second part 40b are arranged in the first direction (in the x-axis direction in the present embodiment) intersecting with the predetermined axis line C shown in FIGS. 12 and 13.

The first part 40a includes three or more first light input and output ports (a first input/output 41). In the present embodiment, the first input/output 41 are arranged in the x-axis direction. The first input/output 41 includes one or plural first input port 41a as the input port 12, and one or plural first output port 41b as the output port 13. For example, one input port 41a and the plural output ports 41b are shown in FIGS. 14 and 15. In this case, the input port 41a inputs a signal light L11 that is a wavelength multiplexing light into the wavelength selective switch 1C. The output port 41b receives a wavelength component L12 deflected by the light deflection element 15C, for example.

As shown in FIG. 15, in the first part 40a, the first input port 41a inputs the signal light L11 along a first optical axis, and the first output port 41b outputs the wavelength component L12 that is incident on the first output port 41b along the first optical axis. The first optical axis is inclined in the first direction (in the x-axis direction in the present embodiment) and is intersecting with the predetermined axis line C. A range of an angle $\theta_1$ of the first optical axis with reference to the predetermined axis line C is preferably $0°<\theta_1<5°$ when the predetermined axis line C is 0°, for example, and more preferably $0°<\theta_1<3°$.

The second part 40b includes three or more second light input and output ports (a second input/output 42). In the present embodiment, the second input/output 42 are arranged in the x-axis direction. The second input/output 42 includes one or plural second input port 42a as the input port 12, and one or plural output port 42b as the second output port 13. For example, one input port 42a and the plural output ports 42b are shown in FIGS. 14 and 15. In this case, the input port 42a inputs a signal light L21 that is a wavelength multiplexing light into the wavelength selective switch 1C. The output port 42b receives a wavelength component L22 deflected by the light deflection element 15C, for example.

As shown in FIG. 15, in the second part 40b, the second input port 42a inputs the signal light L21 along a second optical axis, and the second output port 42b outputs the wavelength component L22 that is incident on the second output port 42b along the second optical axis. The second optical axis is inclined in the first direction (in the x-axis direction in the present embodiment) and is intersecting with the predetermined axis line C. An angle of the second optical axis with reference to the predetermined axis line C is $-\theta_1$, for example, which is different from the angle $\theta_1$ of the first optical axis.

Each of the first input port 41a and the first output port 41b includes an optical fiber 41c and a condensing element (condensing lens) 41d. Each condensing element 41d is provided for each optical fiber 41c on a one-on-one basis, which is optically coupled to an end surface of the corresponding optical fiber 41c. Similarly, each of the second input port 42a and the second output port 42b includes an optical fiber 42c and a condensing element (condensing lens) 42d. Each condensing element 42d is provided for each optical fiber 42c on a one-on-one basis, which is optically coupled to an end surface of the corresponding optical fiber 42c.

As shown in FIG. 15, optical axes of each optical fiber 41c and each condensing element 41d corresponding to each optical fiber 41c are shifted from each other. Specifically, the optical axis of the condensing element 41d is shifted from the optical axis of the optical fiber 41c by $\Delta\alpha$ (>0). Further, the shift amount $\Delta\alpha$ is the same in the three or more light input and output ports of the first input/output 41. Thus, the uniform positive input and output angle $\theta_1$ is assigned to the three or more light input and output ports of the first input/output 41. In the present embodiment, the three or more optical fibers 41c are arranged with the uniform interval $\alpha$. Further, the corresponding three or more condensing elements 41d are arranged with the uniform interval $\alpha$.

On the other hand, similarly, optical axes of each optical fiber 42c and each condensing element 42d corresponding to each optical fiber 42c are shifted from each other in the x-axis direction. However, the shift amount thereof is different from the shift amount of the condensing element 41d, which is $-\Delta\alpha$, for example. Further, the shift amount $-\Delta\alpha$ is the same in the three or more light input and output ports of the second input/output 42. Thus, the uniform negative input and output angle $-\theta_1$ is assigned to the three or more light input and output ports of the second input/output 42. Further, in the present embodiment, the three or more optical fibers 42c are arranged with the uniform interval $\alpha$. Further, the corresponding three or more condensing elements 42d are arranged with the uniform interval $\alpha$.

Further, in the present embodiment, the port array 14C further includes an aligning port 43, in addition to the first input/output 41 and the second input/output 42. The aligning port 43 is a port for inputting and outputting a light L3 along the optical axis in accordance with the predetermined axis line C for alignment. Further, the aligning port 43 includes an optical fiber 43c, and a condensing element 43d that is optically coupled with an end surface of the optical fiber 43c. Here, an optical axis of the optical fiber 43c and an optical axis of the condensing element 43d coincide with each other. Accordingly, the light L3 input and output in the aligning port 43 propagates along the predetermined axis line C.

The aligning port 43 may be provided in common to the first part 40a and the second part 40b, as shown in FIGS. 14 and 15. Alternatively, at least one aligning port 43 may be provided to each of the first part 40a and the second part 40b. In the present embodiment, one aligning port 43 is arranged between the first part 40a and the second part 40b.

The optical fibers 41c and 42c adjacent to the optical fiber 43c and the optical fiber 43c are arranged with the interval $\alpha$. On the other hand, the condensing elements 41d and 42d adjacent to the condensing element 43d and the condensing element 43d are arranged with interval $\alpha+\Delta\alpha$. With such a configuration, the shift amount $\Delta\alpha$ of the optical axes of the optical fiber 41c and the condensing element 41d, and the shift amount $-\Delta\alpha$ of the optical axes of the optical fiber 42c and the condensing element 42d are realized. In other words, in the present embodiment, the optical fibers 41c, 42c and 43c are arranged with an equal pitch, the condensing elements 41d, 42d and 43d are arranged with an unequal pitch. Further, the position of the condensing element 41d is shifted on one side in the arrangement direction (on a positive side on the x-axis) with respect to the optical fiber 41c, and the position of the condensing element 42d is shifted on the other side in the arrangement direction (on a negative side on the x-axis) with respect to the optical fiber 42c.

Returning to FIGS. 12 and 13, in the wavelength selective switch 1C, the first lens 16a and the second lens 16b of the relay optical system 16 are provided in common to the first input/output 41 and the second input/output 42. The first lens 16*a* is arranged so that the front focus of the first lens 16*a* approximately coincides with rear focuses of the condensing elements 41*d* to 43*d* (see FIG. 4). That is, the first lens 16*a* is arranged at a position separated from the condensing elements 41*d* and 42*d* by the focus distance f1 of the condensing elements 41*d* to 43*d* and the focus distance f2 of the first lens 16*a*, provided in the port array 14C.

The anamorphic optical system 17 (prisms 17*a* and 17*b*) is provided in common to the first input/output 41 and the second input/output 42. The anamorphic optical system 17 receives the signal lights L11 and L21 output from the second lens 16*b* of the relay optical system 16, and enlarges the beam sizes of the signal lights L11 and L21 in the y-axis direction for output.

The dispersive element 18 is provided in common to the first input/output 41 and the second input/output 42. The dispersive element 18 changes the optical axes of the input and output lights of the first input/output 41 and the second input/output 42 in a direction intersecting with the predetermined axis line C and the x-axis direction, for example, in the y-axis direction, at an angle according to its wavelength. The dispersive element 18 disperses, if the signal lights L11 and L21 from the input ports 41*a* and 42*a* are wavelength multiplexing lights, the signal lights L11 and L21 into plural wavelength components. In FIGS. 12 and 13, for ease of understanding, certain wavelength components L12 and L22 among the plural wavelength components are shown as representatives.

The condensing lens 19 is provided in common to the first input/output 41 and the second input/output 42. The condensing lens 19 receives the wavelength components L12 and L22 that are dispersed and output by the dispersive element 18, and optically couples the wavelength components L12 and L22 to the light deflection element 15C.

The light deflection element 15C receives the wavelength component L12 condensed by the condensing lens 19, and deflects the wavelength component L12 toward the predetermined light output port (one of the first output port 41*b*) according to its wavelength. Similarly, the light deflection element 15C receives the wavelength component L22 condensed by the condensing lens 19, and deflects the wavelength component L22 toward the predetermined light output port (one of the second output port 42*b*) according to its wavelength. To this end, the light deflection element 15C includes plural light deflection regions (light deflection factor elements) that are arranged in a two-dimensional manner in a plane intersecting with the predetermined axis line C. The light deflection element 15C receives the wavelength components L12 and L22 corresponding to the respective light deflection regions, and independently deflects the wavelength components L12 and L22 toward the first output port 41*b* and the second output port 42*b*, respectively.

Figure 16:
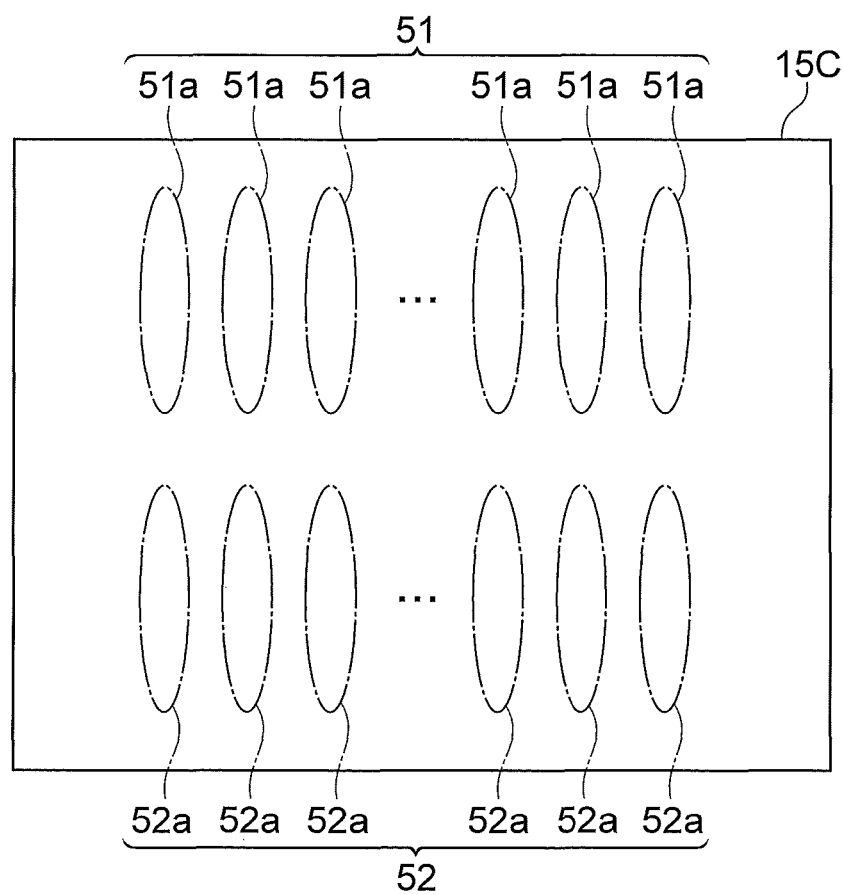
FIG. 16 is a front view of a light deflection element seen from a predetermined axis line direction.

FIG. 16 is a front view of a light deflection element when seen in a predetermined axis line direction. As shown in FIG. 16, the light deflection element 15C includes a first light deflection part 51 and a second light deflection part 52 that are arranged in the x-axis direction. The first light deflection part 51 includes plural light deflection regions 51*a* that are arranged in the y-axis direction (dispersive direction). The first light deflection part 51 receives each wavelength component from the first input port 41*a*, passing through the dispersive element 18, in the corresponding light deflection region 51*a*, and directs the wavelength component to the first output port 41*b*. Further, the second light deflection part 52 includes plural light deflection regions 52*a* that are arranged in the y-axis direction (dispersive direction). The second light deflection part 52 receives each wavelength component from the second input port 42*a*, passing through the dispersive element 18, in the corresponding light deflection region 52*a*, and directs the wavelength component to the second output port 42*b*.

As the light deflection element 15C, for example, a phase modulation element such as LCOS device is preferably used. The phase modulation element includes plural pixels that perform phase modulation, and has a phase modulation pattern of a diffraction grating form to deflect an optical path of the input light. As the light deflection element 15C, for example, various elements such as a MEMS element, as well as the phase modulation element, may be used.

When the LCOS device is used as the light deflection element 15C, in the plane including the predetermined axis line C and the x-axis direction (that is, in the x-z plane), the optical axes of the wavelength components L12 input from the first input port 41*a* and L22 input from the second input port 42*a* may be substantially orthogonal to a modulation surface of the phase modulation element. Thus, an accurate deflection control may be achieved. This configuration may be preferably realized by setting the angle $\theta_1$ of the first optical axis and the angle $-\theta_1$ of the second optical axis with respect to the predetermined axis line C so that the optical axes of the wavelength components L12 and L22 are substantially orthogonal to the modulation surface in the x-z plane. In this case, the optical system (the relay optical system 16 and the anamorphic optical system 17) at the front stage and the condensing lens 19 may change the optical paths of the lights from the first input/output 41 and the second input/output 42 so that the optical axes of the wavelength components L12 and L22 are substantially orthogonal to the modulation surface in the x-z plane.

Further, in this case, it is more preferable that central optical axes of the optical system (the relay optical system 16 and the anamorphic optical system 17) at the front stage in the x-axis direction and the condensing lens 19 coincide with each other. Further, in this case, the optical axes of the input light L11 and the output light L12 of the first input/output 41 and the optical axes of the input light L21 and the output light L22 of the second input/output 42 may be symmetric to each other with respect to the predetermined axis line C. Here, the predetermined axis line C is that when assuming that the light output along the predetermined axis line C reaches the modulation surface of the phase modulation element, the optical axis of the light is orthogonal to the modulation surface of the phase modulation element in the plane including the predetermined axis line C and the x-axis direction (x-z plane).

The wavelength components L12 and L22 deflected by the light deflection element 15C reach the predetermined output ports 41*b* and 42*b* through the condensing lens 19, the dispersive element 18, the anamorphic optical system 17 and the relay optical system 16, and are output to the outside of the wavelength selective switch 1C.

Effects obtained by the wavelength selective switch 1C of the present embodiment having the above-described configuration will be described. For example, in a wavelength selective switch disclosed in Japanese Unexamined Patent Application Publication No. 2011-248000, lenses corresponding to two or more groups of light input and output parts are arranged, and different angles are assigned to optical axes of input and output lights for each group. However, in such a configuration, the number of parts is increased, and the length of an optical path is increased corresponding to the lenses, which obstructs miniaturization of the wavelength selective switch.

On the other hand, in the wavelength selective switch 1C of the present embodiment, these lenses are not used, and the predetermined angles are given to the optical axes of the input and output lights in the first input/output 41 and the second input/output 42 of the port array 14C, respectively. Accordingly, according to the wavelength selective switch 1C of the present embodiment, the number of parts may be reduced, and more wavelength components may be separated (or coupled) without excessively increasing the length of the optical path.

Further, as in the present embodiment, the first input/output 41 and the second input/output 42 may include the optical fibers 41c and 42c, and the condensing elements 41d and 42d that are provided on the one-on-one basis with respect to the optical fibers 41c and 42c and are optically coupled to the end surfaces of the optical fibers 41c and 42c. In this case, by allowing the optical axes of the optical fibers 41c and 42c and the optical axes of the condensing elements 41d and 42d to shift from each other, the angle $\theta_1$ of the first optical axis and the angle $-\theta_1$ of the second optical axis with respect to the predetermined axis line C may easily be set even by a simple configuration. Further, with such a configuration, since the condensing elements 41d and 42d can ensure sufficiently effective diameters, the absolute value of angles $\theta_1$ and $-\theta_1$ may be sufficiently increased even when the wavelength selective switch 1C is miniaturized.

Further, as in the present embodiment, the port array 14C may further include the aligning port 43 in addition to the first input/output 41 and the second input/output 42 that inputs and outputs of the light L3 along the optical axis in accordance with the predetermined axis line C for alignment. It is difficult to use the light from the first input port 41a and the second input port 41b for alignment due to the angles $\theta_1$ and $-\theta_1$, but by separately providing the aligning port 43, the alignment operation may easily be performed.

The above-described embodiments are embodiments of a wavelength selective switch according to one aspect of the present invention. Accordingly, the wavelength selective switch according to one aspect of the present invention is not limited to the wavelength selective switches 1 to 1C. The wavelength selective switch according to one aspect of the invention may include arbitrary modifications of the wavelength selective switches 1 to 1C in a range without departing from the spirit of claims.

For example, in the above-described embodiments, the wavelength selective switches 1B provided with the polarization diversity module 30 with respect to the wavelength selective switch 1A is described. However, the polarization diversity module 30 may be provided to the wavelength selective switches 1 and 1C.

Further, in the above-described embodiments, the wavelength selective switches 1C in which the port array 14C and the light deflection element 15C are applied to the wavelength selective switch 1 is described. However, the port array 14C and the light deflection element 15C may be applied to the wavelength selective switches 1A and 1B.

Further, in the above-described embodiments, the example is described in which the wavelength selective switches 1 to 1B are applied to a case where the wavelength multiplexing light is input from the input port 12 and the dispersed lights of the respective wavelength components are output through the output port 13, but the wavelength selective switches 1 to 1B may be applied to a case where lights of respective wavelength components are input from the plurality of output ports 13 and a combined wavelength multiplexing light is output through the input port 12.

Further, in the above-described embodiments, the port array 14 has the configuration in which the ports 12 and 13 thereof respectively include the optical fibers 12a and 13a and the collimating lenses 12b and 13b, but the configuration of the port array 14 is not limited thereto.

What is claimed is:

1. A wavelength selective switch comprising:
a port array that includes an input port for inputting a signal light and an output port for outputting the signal light which are arranged in a first direction;
a dispersive element that disperses the signal light in a second direction different from the first direction;
a condensing element that condenses signal lights dispersed by the dispersive element, respectively;
a light deflection element that deflects each of the signal lights condensed by the condensing element toward the output port;
a first optical system that matches a beam waist position of the signal light incident onto the condensing element with a front focus of the condensing element in an optical axis direction of the signal light, in a first plane that extends in the first direction and the optical axis direction; and
a second optical system that shifts the beam waist position of the signal light incident onto the condensing element from the front focus in the optical axis direction, in a second plane that extends in the second direction and the optical axis direction.

2. The wavelength selective switch according to claim 1, wherein the first optical system includes a first element having an optical power in the first plane and the second plane, and a second element having an optical power at least in the first plane.

3. The wavelength selective switch according to claim 1, wherein the second optical system disposes the beam waist position of the signal light incident onto the condensing element at a front stage of the front focus in the optical axis direction in the second plane.

4. The wavelength selective switch according to claim 3, wherein the second optical system includes a third element having an optical power only in the first plane among the first plane and the second plane.

5. The wavelength selective switch according to claim 1, wherein the second optical system disposes the beam waist position of the signal light incident onto the condensing element at a rear stage of the front focus in the optical axis direction in the second plane.

6. The wavelength selective switch according to claim 5, wherein the second optical system includes at least one pair of prisms.

7. The wavelength selective switch according to claim 6, wherein an incident angle of the signal light input to the prisms is equal to or greater than 70 degrees.

8. The wavelength selective switch according to claim 7, wherein a refractive index of the prisms is equal to or higher than 1.5.

9. The wavelength selective switch according to claim 8, wherein the refractive index of the prism is equal to or higher than 3.0.

10. The wavelength selective switch according to claim 6, wherein an incident angle of the signal light input to the prisms is approximately the same as a Brewster angle.

11. The wavelength selective switch according to claim 1, further comprising:

a third optical system that enlarges a distance from the beam waist position of the signal light incident onto the condensing element to the condensing element in the second plane.

12. The wavelength selective switch according to claim 11, wherein the third optical system includes at least one pair of prisms.

13. The wavelength selective switch according to claim 1, wherein in the second plane, when a distance from the beam waist position of the signal light incident onto the condensing element to the condensing element is $S_{1y}$, a focus distance of the condensing element is $f_4$, and a beam size at a beam waist position of a signal light output from the condensing element is $D_{2y}$, a first value $V_1$ expressed by the following Expression (1) is smaller than a change point where the beam size $D_{2y}$ is changed when the first value $V_1$ is changed $$V_1 = \left|\frac{S_{1y}}{f_4}\right|. \quad (1)$$

14. The wavelength selective switch according to claim 1, wherein in the second plane, when a distance from the beam waist position of the signal light incident onto the condensing element to the condensing element is $S_{1y}$, a focus distance of the condensing element is $f_4$, and a beam size at a beam waist position of a signal light output from the condensing element is $D_{2y}$, a first value $V_1$ expressed by the following Expression (1) is greater than a change point where the beam size $D_{2y}$ is changed when the first value $V_1$ is changed $$V_1 = \left|\frac{S_{1y}}{f_4}\right|. \quad (1)$$

15. The wavelength selective switch according to claim 1, further comprising:
a fourth optical system that enlarges a second value $Z_{ry}$ expressed by the following Expression (2), in the second plane, when a beam size at the beam waist position of the signal light incident onto the condensing element is $D_{1y}$, and a wavelength of the signal light is $\lambda$ $$Z_{ry} = \frac{\pi D_{1y}^2}{4\lambda}. \quad (2)$$

16. The wavelength selective switch according to claim 15, wherein the fourth optical system includes at least one pair of prisms.

17. The wavelength selective switch according to claim 1, wherein in the second plane, when a beam size at the beam waist position of the signal light incident onto the condensing element is $D_{1y}$, a wavelength of the signal light is $\lambda$, and a focus distance of the condensing element is $f_4$, a third value $V_3$ expressed by the following Expression (3) using the second value $Z_{ry}$ expressed by the following Expression (2) is equal to or greater than 4

$$Z_{ry} = \frac{\pi D_{1y}^2}{4\lambda} \quad (2)$$

-continued $$V_3 = \frac{Z_{ry}}{f_4}. \quad (3)$$

18. The wavelength selective switch according to claim 1, wherein the light deflection element is arranged at the beam waist position of the signal light output from the condensing element in the second plane.

19. The wavelength selective switch according to claim 18, wherein, when a distance from a beam waist position of the signal light output from the condensing element to the condensing element in the second plane is $S_{2y}$, a beam size of the signal light at a beam waist position of the signal light output from the condensing element in the first plane is $D_{2x}$, a focus distance of the condensing element is $f_4$, and a wavelength of the signal light is $\lambda$, the following Expression (4) is satisfied $$|S_{2y} - f_4| \le \frac{\pi D_{2x}^2}{4\lambda}. \quad (4)$$

20. The wavelength selective switch according to claim 1, further comprising:
a polarization diversity module arranged at a front stage of the first optical system.

21. The wavelength selective switch according to claim 20, wherein the polarization diversity module includes a polarization beam splitter that separates the signal light according to a polarization direction in the second direction, a polarization rotation element that allows a polarization direction of one of signal lights separated by the polarization beam splitter to coincide with a polarization direction of the other thereof, and an optical path adjustment element that allows the length of an optical path of one of the signal lights separated by the polarization beam splitter to coincide with the length of an optical path of the other thereof.

22. The wavelength selective switch according to claim 1, wherein the port array, the dispersive element and the light deflection element are arranged on a predetermined axis line,
the port array includes
a first part that includes a first input/output having a first input port that is one of the input port for inputting the signal light along a first optical axis and a first output port that is one of the output port for outputting the signal light incident on the first output port along the first optical axis, and the first optical axis is inclined in the first direction with respect to the predetermined axis line, and
a second part that includes a second input/output having a second input port that is one of the input port for inputting the signal light along a second optical axis and a second output port that is one of the output port for outputting the signal light incident on the second output port along the second optical axis, and the second optical axis is inclined in the first direction with respect to the predetermined axis line,
an inclination angle of the first optical axis and an inclination angle of the second optical axis with reference to the predetermined axis line are different from each other,
the dispersive element is provided in common to the first input/output and the second input/output, and the light deflection element includes
- a first light deflection part that directs the signal light input from the first input port toward the first output port, and
- a second light deflection part that directs the signal light input from the second input port toward the second output port.

* * * * *